(12) United States Patent
Shinkai et al.

(10) Patent No.: US 7,720,798 B2
(45) Date of Patent: May 18, 2010

(54) TRANSMITTER-RECEIVER SYSTEM, TRANSMITTING APPARATUS, TRANSMITTING METHOD, RECEIVING APPARATUS, RECEIVING METHOD, AND PROGRAM

(75) Inventors: Mitsutoshi Shinkai, Kanagawa (JP); Fumihiro Nagasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 248 days.

(21) Appl. No.: 11/559,088

(22) Filed: Nov. 13, 2006

(65) Prior Publication Data
US 2007/0136229 A1 Jun. 14, 2007

(30) Foreign Application Priority Data
Nov. 29, 2005 (JP) ............................. 2005-343190

(51) Int. Cl.
G06F 17/00 (2006.01)
(52) U.S. Cl. .................... 707/104.1; 707/101; 707/102; 707/103 X
(58) Field of Classification Search .................. 707/10, 707/103 Y, 104.1, 200, 101, 102, 103 X; 725/29; 380/201; 368/46; 706/46
See application file for complete search history.

(56) References Cited

U.S. PATENT DOCUMENTS

| | | | | |
|---|---|---|---|---|
| 6,262,767 | B1* | 7/2001 | Wakui | 348/211.99 |
| 6,931,198 | B1* | 8/2005 | Hamada et al. | 386/46 |
| 2005/0114882 | A1* | 5/2005 | Sakamaki et al. | 725/29 |
| 2006/0106884 | A1* | 5/2006 | Blumenau et al. | 707/200 |
| 2007/0053513 | A1* | 3/2007 | Hoffberg | 380/201 |
| 2007/0112714 | A1* | 5/2007 | Fairweather | 706/46 |

FOREIGN PATENT DOCUMENTS

| | | |
|---|---|---|
| JP | 2000-23015 | 1/2000 |
| JP | 2000-341636 | 12/2000 |
| JP | 2004-164129 | 6/2004 |
| JP | 2004-171719 | 6/2004 |

OTHER PUBLICATIONS

Daniela Rus et al., "Customizing information capture and access", ACM, Jan. 1997, pp. 67-101.*
U.S. Appl. No. 11/558,218, filed Nov. 9, 2006, Shinkai, et al.
U.S. Appl. No. 11/561,219, filed Nov. 17, 2006, Shinkai, et al.
U.S. Appl. No. 11/560,636, filed Nov. 16, 2006, Shinkai.

* cited by examiner

Primary Examiner—Thuy N Pardo
(74) Attorney, Agent, or Firm—Oblon, Spivak, McClelland, Maier & Neustadt, L.L.P.

(57) ABSTRACT

A transmitter-receiver system includes: a transmitting apparatus configured to transmit data categorized into groups recorded on a recording medium; and a receiving apparatus configured to receive the data; wherein the transmitting apparatus includes: a read unit configured to read a destination of the data, the destination which is recorded on the recording medium and associated with the group of the data; and a transmitting unit configured to transmit data categorized into a predetermined group and group information showing the group to the destination read by the read unit, and the receiving apparatus includes: a receiving unit configured to receive data and group information transmitted from the transmitting unit; and a record control unit configured to record the data in a folder corresponding to the group based on the group information.

12 Claims, 13 Drawing Sheets

*FIG. 6*

1. GROUP TITLE
2. RECORDING ID
3. CATEGORY
4. ORIGINAL
5. DATE AND TIME TO CREATE GROUPS
6. DESTINATION
    (1) NAME
    (2) E-MAIL ADDRESS
    (3) WEBSITE URL
7. DATE AND TIME TO SHOOT
    (1) SCHEDULED
    (2) CARRIED OUT
8. RECORDING LOCATION
    (1) SCHEDULED
    (2) CARRIED OUT
9. PERSON TO SHOOT
    (1) SCHEDULED
    (2) CARRIED OUT
10. CONTENTS TO SHOOT
    (1) INSTRUCTION
    (2) ACTUAL CONTENTS (NOTES)
11. SHOT MATERIAL (FILE)
    (1) TITLE
    (2) UMID
    (3) NOTES
    (4) TRANSMISSION HISTORY

FIG. 7 tilte, xxxx, category, xxxx, original, xxxx, date created, xxxx, send to, xxxx, e-mail address, xxxx, site URL, xxxx, date directed, xxxx, date carried out, xxxx, place directed, xxxx, place carried out, xxxx, person directed, xxxx, person carried out, xxxx, description directed, xxxx, description occurred, xxxx, file title, xxxx, file ID, xxxx, memo, xxxx , file title, xxxx, file ID, xxxx, memo, xxxx, file title, xxxx, file ID, xxxx, memo, xxxx

FIG. 8

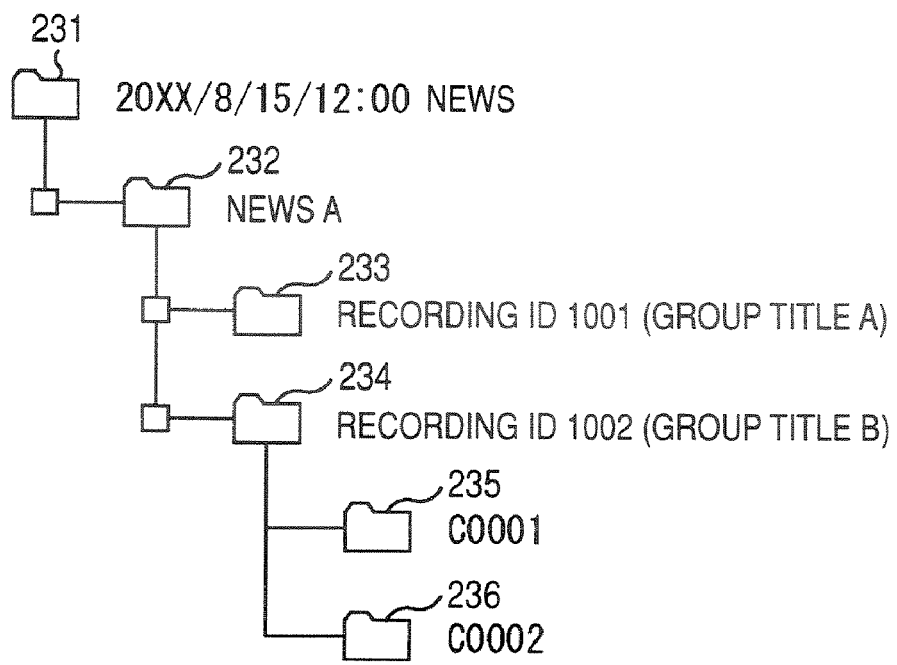

TRANSMITTER-RECEIVER SYSTEM, TRANSMITTING APPARATUS, TRANSMITTING METHOD, RECEIVING APPARATUS, RECEIVING METHOD, AND PROGRAM

CROSS REFERENCES TO RELATED APPLICATIONS

The present invention contains subject matter related to Japanese Patent Application JP 2005-343190 filed in the Japanese Patent Office on Nov. 29, 2005, the entire contents of which being incorporated herein by reference.

BACKGROUND OF THE INVENTION

1. Field of the Invention

The present invention relates to a transmitter-receiver system, a transmitting apparatus, a transmitting method, a receiving apparatus, a receiving method, and a program, particularly to a transmitter-receiver system, a transmitting apparatus, a transmitting method, a receiving apparatus, a receiving method, and a program in which when data is transmitted to another device and recorded therein, the data is allowed to be easily stored in a desired folder in a desired device.

2. Description of the Related Art

In recent years, there is a recording apparatus which acquires material data from a recording medium of a "CAMCORDER (Registered Trademark of Sony Corporation)" video camera over a network, for example, and records it, the video camera which records material data such as image data and sound data acquired by shooting and recording in a recording medium.

For example, there is a disk recorder which acquires image data from a camera integrated videotape recorder and dubs it on an optical disc, the camera integrated videotape recorder which acquires image data and records it on videotape (for example, see JP-A-2004-171719 (Patent Reference 1)).

SUMMARY OF THE INVENTION

However, in the video camera described above, when material data is transmitted, it is necessary for a user to specify the destination of the material data. In addition, in the recording apparatus described above, the material data transmitted from the video camera is categorized and recorded in a directory (folder), it is necessary for the user to specify a directory to be the record destination of the material data that is to be transmitted to the recording apparatus, which will be troublesome.

In view of the circumstances, it is desirable that when data is transmitted to another device and recorded therein, the data is allowed to be easily stored in a desired folder in a desired device.

A transmitter-receiver system according to a first embodiment of the invention is a transmitter-receiver system including: a transmitting apparatus configured to transmit data categorized into groups recorded on a recording medium; and a receiving apparatus configured to receive the data; wherein the transmitting apparatus includes: a read unit configured to read a destination of the data, the destination which is recorded on the recording medium and associated with the group of the data; and a transmitting unit configured to transmit data categorized into a predetermined group and group information showing the group to the destination read by the read unit, and the receiving apparatus includes: a receiving unit configured to receive data and group information transmitted from the transmitting unit; and a record control unit configured to record the data in a folder corresponding to the group based on the group information.

A transmitting apparatus according to a second embodiment of the invention is a transmitting apparatus configured to transmit data categorized into groups recorded on a recording medium, the transmitting apparatus including: a read unit configured to read a destination of the data, the destination which is recorded on the recording medium and associated with the group of the data; and a transmitting unit configured to transmit data categorized into a predetermined group and group information showing the group to the destination read by the read unit.

In the transmitting apparatus, the group may be a group for each of devices by which a content of the data, or the data is recorded on the recording medium.

A transmitting method according to the second embodiment of the invention is a transmitting method of a transmitting apparatus configured to transmit data categorized into groups recorded on a recording medium, the transmitting method including the steps of: reading a destination of the data, the destination which is recorded on the recording medium and associated with the group of the data; and transmitting data categorized into a predetermined group and group information showing the group to the read destination.

A program according to the second embodiment of the invention is a program configured to allow a computer to execute a process to transmit data categorized into groups recorded on a recording medium, the program including the steps of: reading a destination of the data, the destination which is recorded on the recording medium and associated with the group of the data; and transmitting data categorized into a predetermined group and group information showing the group to the read destination.

A receiving apparatus according to a third embodiment of the invention is a receiving apparatus configured to receive data categorized into groups and group information showing the group, the receiving apparatus including: a receiving unit configured to receive the data and the group information; and a record control unit configured to record the data in a folder corresponding to the group based on the group information.

A receiving method according to the third embodiment of the invention is a receiving method of a receiving apparatus configured to receive data categorized into groups and group information showing the group, the receiving method including the steps of: receiving the data and the group information; and recording the data in a folder corresponding to the group based on the group information.

A program according to the third embodiment of the invention is a program configured to allow a computer to execute a process to receive data categorized into groups and group information showing the group, the program including the steps of: receiving the data and the group information; and recording the data in a folder corresponding to the group based on the group information.

In the first embodiment of the invention, in the transmitting apparatus, a destination of data is read, the destination which is recorded on a recording medium and associated with a group of data, and data categorized into a predetermined group and group information showing the group are transmitted to the destination. In addition, in the receiving apparatus, data and group information transmitted from the transmitting apparatus are received, and the data is recorded in a folder corresponding to the group based on the group information.

In the second embodiment of the invention, a destination of data is read, the destination which is recorded on a recording medium and associated with a group of data, and data categorized into a predetermined group and group information showing the group are transmitted to the destination.

In the third embodiment of the invention, data categorized into groups and group information showing a group are received, and the data is recorded in a folder corresponding to the group based on the group information.

As described above, according to the first embodiment of the invention, data transmitted from another device can be recorded. In addition, according to the first embodiment of the invention, when data is transmitted to another device and recorded therein, the data is allowed to be easily stored in a desired folder in a desired device.

According to the second embodiment of the invention, data can be transmitted to another device. In addition, according to the second embodiment of the invention, when data is transmitted to another device and recorded therein, data can be easily recorded in a desired folder in a desired device.

According to the third embodiment of the invention, data transmitted from another device can be received. In addition, according to the third embodiment of the invention, data transmitted from another device can be easily recorded in a desired folder.

BRIEF DESCRIPTION OF THE DRAWINGS

FIG. 6 shows a diagram depicting exemplary contents of the items of grouping metadata;

FIG. 7 shows a diagram depicting exemplary grouping metadata;

FIG. 8 shows a diagram depicting an exemplary screen for displaying the directory structure of files recorded in a recording part;

DETAILED DESCRIPTION OF THE INVENTION

Figure 1:
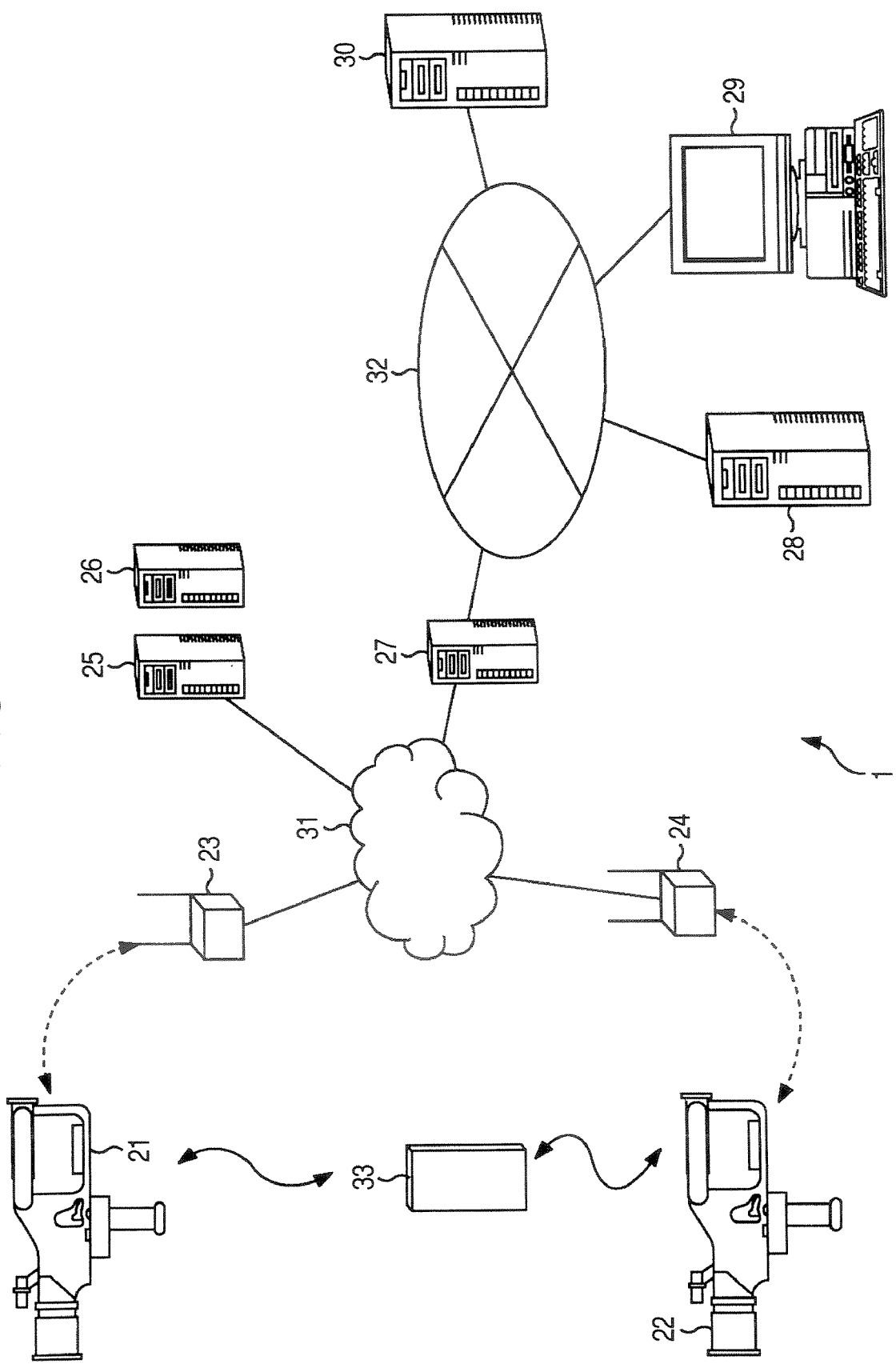
FIG. 1 shows a diagram depicting an exemplary configuration of a network system to which an embodiment of the invention is adapted.

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

A transmitter-receiver system according to a first embodiment of the invention is a transmitter-receiver system including: a transmitting apparatus (for example, a video camera 21 shown in FIG. 1) configured to transmit data categorized into groups recorded on a recording medium (for example, a removable medium 33 shown in FIG. 1); and a receiving apparatus (for example, a material using unit 29 shown in FIG. 1) configured to receive the data; wherein the transmitting apparatus includes: a read unit (for example, a destination detecting part 251 shown in FIG. 9) configured to read a destination of the data, the destination which is recorded on the recording medium and associated with the group of the data; and a transmitting unit (for example, a transmitting part 253 shown in FIG. 9) configured to transmit data categorized into a predetermined group and group information (for example, a recording ID) showing the group to the destination read by the read unit, and the receiving apparatus includes: a receiving unit (for example, a receiving part 271 shown in FIG. 10) configured to receive data and group information transmitted from the transmitting unit; and a record control unit (for example, a record control part 273 shown in FIG. 10) configured to record the data in a folder corresponding to the group based on the group information.

A transmitting apparatus according to a second embodiment of the invention is a transmitting apparatus (for example, the video camera 21 shown in FIG. 1) configured to transmit data categorized into groups recorded on a recording medium (for example, the removable medium 33 shown in FIG. 1), the transmitting apparatus including: a read unit (for example, the destination detecting part 251 shown in FIG. 9) configured to read a destination of the data, the destination which is recorded on the recording medium and associated with the group of the data; and a transmitting unit (for example, the transmitting part 253 shown in FIG. 9) configured to transmit data categorized into a predetermined group and group information (for example, the recording ID) showing the group to the destination read by the read unit.

Figure 11:
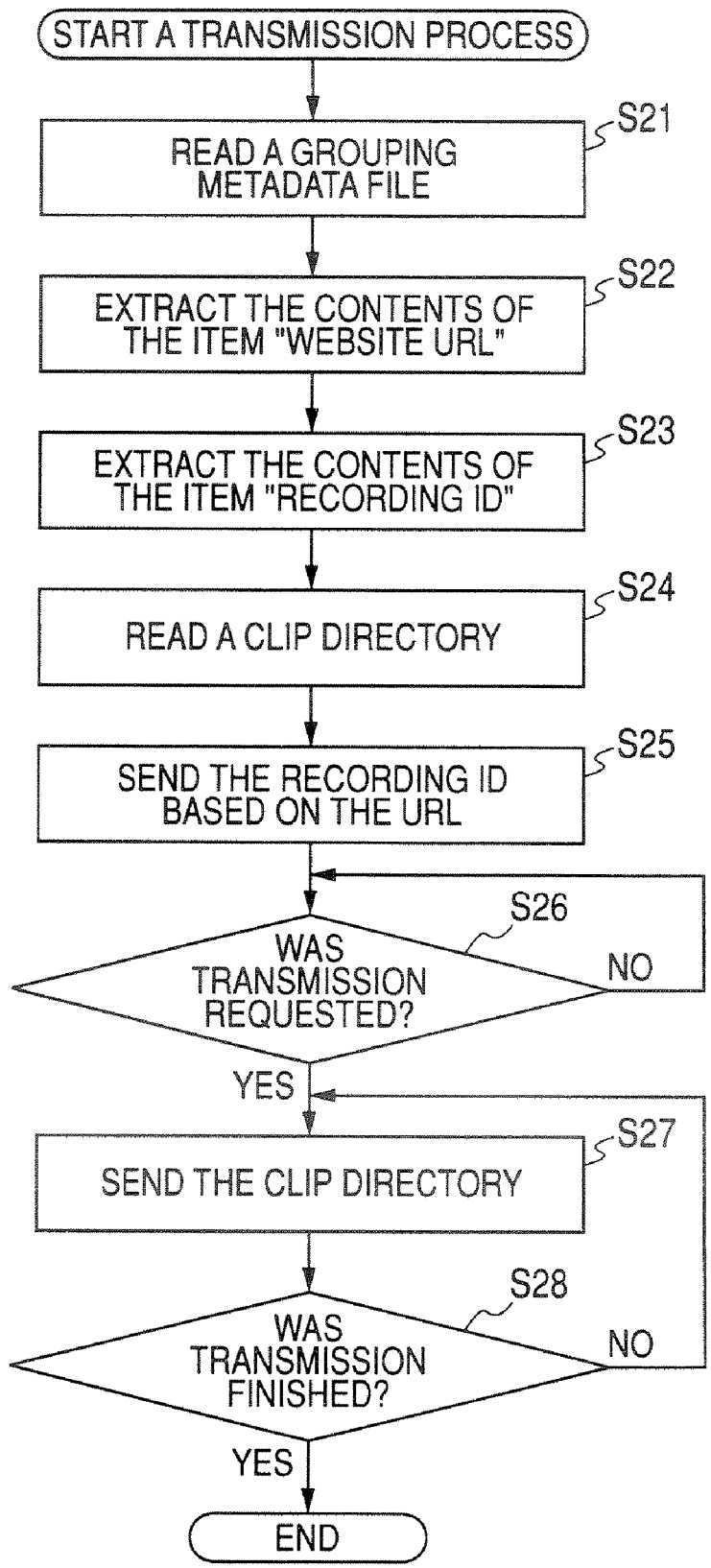
FIG. 11 shows a flow chart illustrative of a transmission process.

A transmitting method according to a second embodiment of the invention is a transmitting method of a transmitting apparatus (for example, the video camera 21 shown in FIG. 1) configured to transmit data categorized into groups recorded on a recording medium (for example, the removable medium 33 shown in FIG. 1), the transmitting method including the steps of: reading a destination of the data, the destination which is recorded on the recording medium and associated with the group of the data (for example, Step S22 shown in FIG. 11); and transmitting data categorized into a predetermined group and group information (for example, the recording ID) showing the group to the read destination (for example, Steps S25 and S27 shown in FIG. 11).

A program according to the second embodiment of the invention is a program configured to allow a computer to execute a process to transmit data categorized into groups recorded on a recording medium (for example, the removable medium 33 shown in FIG. 1), the program including the steps of: reading a destination of the data, the destination which is recorded on the recording medium and associated with the group of the data (for example, Step S22 shown in FIG. 11); and transmitting data categorized into a predetermined group and group information (for example, the recording ID) showing the group to the read destination (for example, Steps S25 and S27 shown in FIG. 11).

A receiving apparatus according to a third embodiment of the invention is a receiving apparatus configured to receive data categorized into groups and group information (for example, the recording ID) showing the group, the receiving apparatus including: a receiving unit (for example, the receiving part 271 shown in FIG. 10) configured to receive the data and the group information; and a record control unit (for example, the record control part 273 shown in FIG. 10) configured to record the data in a folder corresponding to the group based on the group information.

Figure 12:
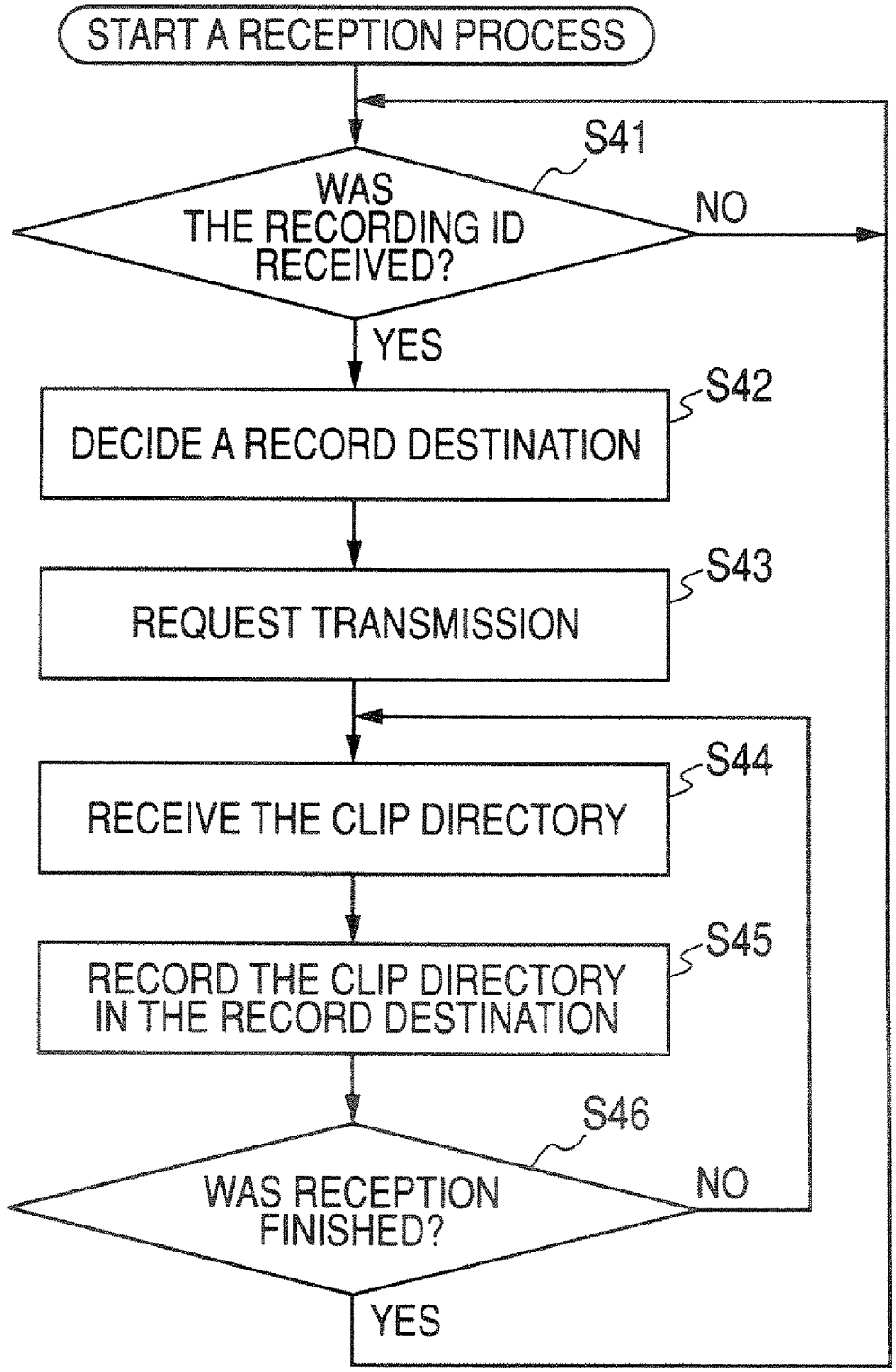
FIG. 12 shows a flow chart illustrative of a reception process.

A receiving method according to the third embodiment of the invention is a receiving method of a receiving apparatus (for example, the material using unit 29 shown in FIG. 1) configured to receive data categorized into groups and group information showing the group, the receiving method including the steps of: receiving the data and the group information (for example, Steps S41 and S44 shown in FIG. 12); and recording the data in a folder corresponding to the group based on the group information (for example, Step S45 shown in FIG. 12).

A program according to the third embodiment of the invention is a program configured to allow a computer to execute a process to receive data categorized into groups and group information (for example, the recording ID) showing the group, the program including the steps of: receiving the data and the group information (for example, Steps S41 and S44 shown in FIG. 12); and recording the data in a folder corresponding to the group based on the group information (for example, Step S45 shown in FIG. 12).

Hereinafter, specific embodiments to which the invention is adapted will be described in detail with reference to the drawings.

FIG. 1 shows an exemplary configuration of a network system 1 to which an embodiment of the invention is adapted.

For example, the network system 1 shown in FIG. 1 is a program production support system for use in production of television programs. The process steps of production of a television program are basically categorized into planning (construction), recording and editing (production). Planning (construction) is the process step of controlling the overall production of a television program, which planes and conceives a television program to be produced to create the scenario (script) of the television program.

For example, recording is the process step of actually recording at a production site in accordance with a production instruction and a scenario, which acquires material data such as image data and sound data in each scene configuring the television program as well as records the shooting situations (including taking sounds). Editing (production) is the process step of editing material data acquired by recording, or adding other information not acquired by recording (CG/SI (Computer Graphics/Superimpose), narration, or library shot and music) to material data acquired by recording, or to material data after edited (an edited result) based on the production instruction and the scenario to produce a full package that is data (material data) completed as a television program.

The network system 1 shown in FIG. 1 is a program production support system configured to support work at each of the process steps. The network system 1 is configured of video cameras 21 and 22, access points 23 and 24, servers 25 and 26, a firewall 27, a material server 28, a material using unit 29, a full package server 30, a network 31, and an intranet 32.

The video cameras 21 and 22 are a device for use in recording a news program that is a television program and a sport game, and in shooting a motion picture (including taking sounds), etc. The video cameras 21 and 22 record material data acquired by shooting a subject in a removable medium 33 such as a magnetic disc, an optical disc including DVD (Digital Versatile Disc), a magneto-optical disc, a memory card, removable hard disk drive, etc.

In addition, the video cameras 21 and 22 create information to be useful in edit processing at a later stage, for example, like information related to recording based on user entry, and associate it as metadata with material data acquired in the video cameras 21 and 22. Furthermore, the video cameras 21 and 22 read material data from the removable medium 33 mounted to the video cameras, connect to the access point 23 or 24 through radio, and transmit material data to the other devices (the material using unit 29 and so on) over the network 31 such as the Internet connected to the access points 23 and 24.

To the video cameras 21 and 22, the servers 25 and 26 are connected through the access point 23 or 24 and the network 31. To the servers 25 and 26, the material data acquired by the video cameras 21 and 22 is supplied and recorded as necessary.

The intranet 32 is connected to the network 31 through the firewall 27, and the firewall 27 protects unauthorized access to the intranet 32 from the network 31.

To the intranet 32, the material server 28, the material using unit 29, and the full package server 30 are also connected.

The material server 28 stores material data supplied from the material using unit 29 through the intranet 32. The material using unit 29 records material data transmitted (uploaded) from the video cameras 21 and 22 through the access point 23 or 24, the network 31, the firewall 27, and the intranet 32. In addition, the material using unit 29 supplies the recorded material data to the material server 28.

Furthermore, the material using unit 29 reads material data stored therein or material data stored in the material server 28, and creates a full package. Then, the material using unit 29 supplies the full package to the full package server 30 through the intranet 32. The full package server 30 stores the full package supplied from the material using unit 29.

In addition, hereinafter, when it is unnecessary to distinguish between the video cameras 21 and 22, they are collectively called the video camera 21. In addition, when it is unnecessary to distinguish between the access points 23 and 24, they are collectively called the access point 23.

Next, a work flow for operators who produce a television program in the network system 1 shown in FIG. 1 will be described in detail with reference to FIG. 2. In addition, in FIG. 2, it is supposed that operators produce a news program.

Figure 2:
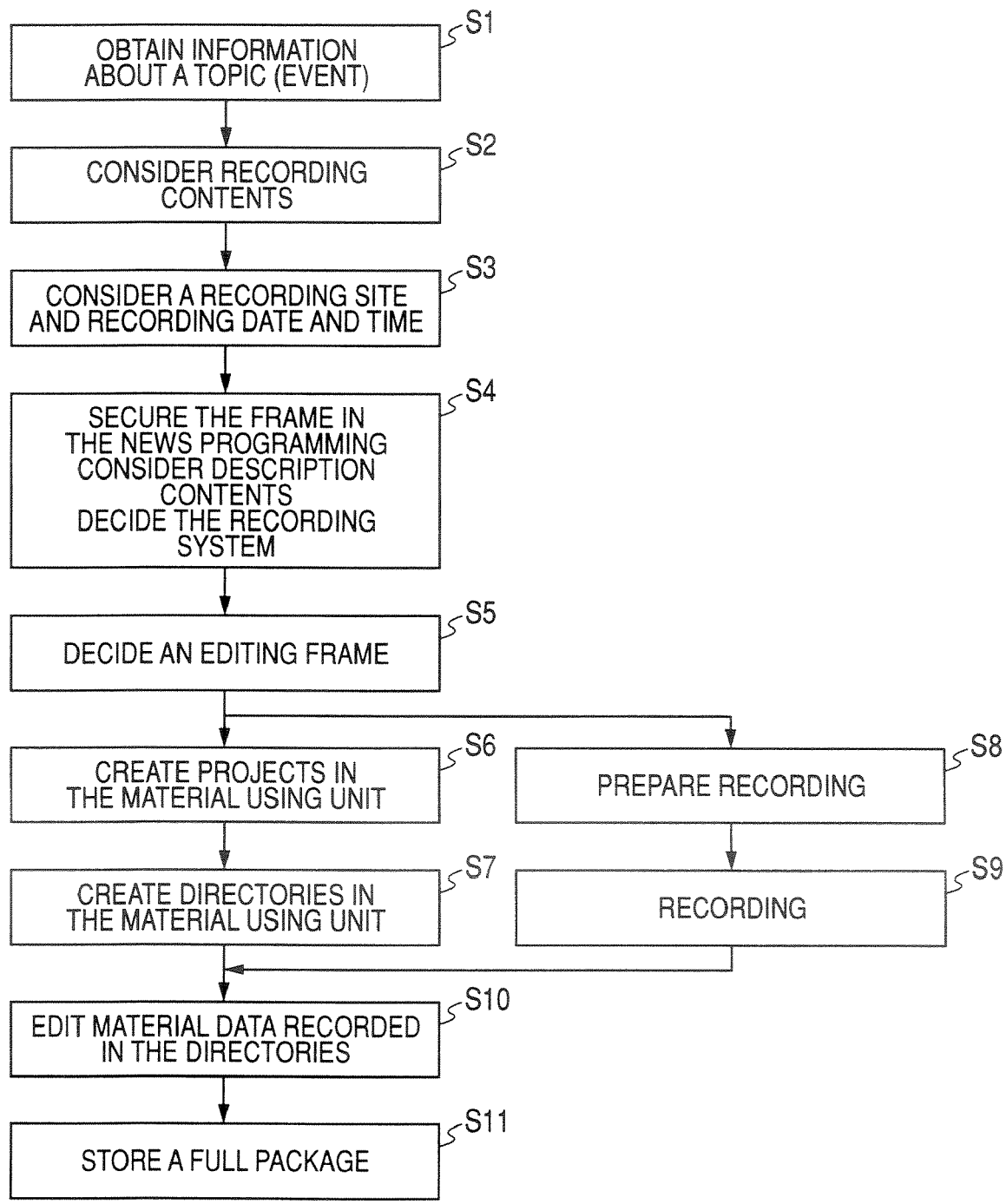
FIG. 2 shows a diagram detailedly illustrative of a work flow for operators who produce a television program.

As shown in FIG. 2, at Step S1, a planning operator who conducts the process steps of planning obtains information about a topic (event) for news, and the process goes to Step S2. At Step S2, the planning operator considers (decides) recording contents based on the information obtained at Step S1.

In addition, the recording contents are distinguished between the individual topics. Here, it is assumed that there are multiple recording contents decided at Step S2. The planning operator acquires recording IDs that are unique IDs to the recording contents from an NRC (newsroom computer), not shown, which manages television programs for each of recording contents.

After the process at Step S2, the process goes to Step S3. The planning operator considers a recording site (shooting location) and recording date and time (date and time to shoot).

After the process at Step S3, the process goes to Step S4. The planning operator enters a frame (time frame) to broadcast the recording contents considered at Step S2 into the schedule of the news program managed (stored) by the NRC, whereby the time frame is secured in the news program. In addition, the planning operator considers description contents that describe the recording contents, and creates a script of the description contents to store it in the NRC. Furthermore, the planning operator decides a recording system including a recording person (cameraperson), the ID of the video camera 21 to record (hereinafter, called a device ID), a recording plan (a time table in the recording contents), etc.

After the process at Step S4, the process goes to Step S5. The planning operator decides an editing frame that shows the broadcast order of the recording contents in the time frame secured at Step S2. After the process at Step S5, an editing operator who conducts the process steps of editing creates a project (a unit of editing work) in the material using unit 29 based on the time frame secured at Step S4, and stores the script of the description contents at Step S4 in the material using unit 29.

After the process at Step S6, the process goes to Step S7. The editing operator creates directories (folders) for every recording ID and other data in the material using unit 29. In addition, the directory is associated with the recording ID. In addition, after the process at Step S5, the process goes to Step S8. A recording operator who conducts the process steps of recording prepares recording. More specifically, the recording operator mounts the removable medium 33 on the video camera 21, and records the recording ID acquired from the NRC in the video camera 21 which records the recording contents associated with the recording ID. In addition, the recording operator records a group of metadata (hereinafter, called grouping metadata), described later, for every recording ID in the video camera 21 based on the editing frame decided at Step S5.

After the process at Step S8, the process goes to Step S9. For example, the recording operator visits the recording site on the recording date and time considered at Step S3, and uses the video camera 21 to record the recording contents considered at Step S2. Then, the recording operator transmits the material data resulted from recording and the recording ID to the material using unit 29 from the video camera 21 via the access point 23, the network 31 and others. Thus, in the material using unit 29, the material data is recorded in the directory associated with the recording ID.

After the process at Steps S7 and S9, the process goes to Step S10. The editing operator edits the material data stored in the directories of the material using unit 29, and the process goes to Step S11. At Step S11, the editing operator forms the material data resulted from editing into a full package, and saves (stores) it in the full package server 30 from the material using unit 29 through the intranet 32.

Figure 3:
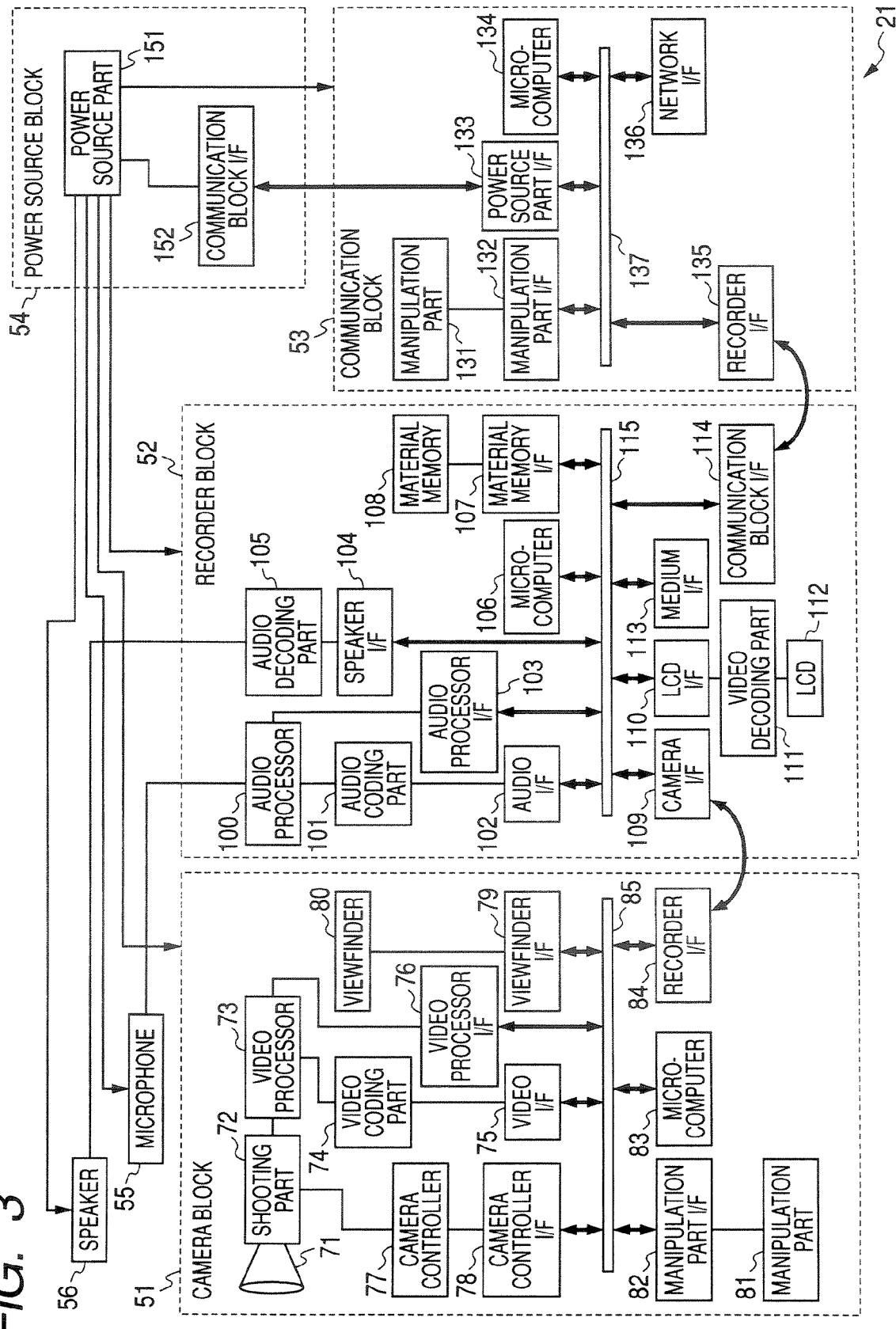
FIG. 3 shows a block diagram depicting an exemplary hardware configuration of a video camera shown in FIG. 1.

FIG. 3 shows a block diagram depicting an exemplary hardware configuration of the video camera 21 shown in FIG. 1.

The video camera 21 shown in FIG. 3 is configured of a camera block 51, a recorder block 52, a communication block 53, a power source block 54, a microphone 55, and a speaker 56.

The camera block 51 is configured of a lens part 71, a shooting part 72, a video processor 73, a video coding part 74, a video I/F (Interface) 75, a video processor I/F 76, a camera controller 77, a camera controller I/F 78, a viewfinder I/F 79, a viewfinder 80, a manipulation part 81, a manipulation part I/F 82, a microcomputer 83, a recorder I/F 84, and a bus 85, and the block shoots a subject and supplies resulted image data (video data) to the recorder block 52.

The shooting part 72 is configured of a CCD (Charge Coupled Device), for example, and acquires the light from the subject through the lens part 71 to shoot the subject. The shooting part 72 supplies to the video processor 73 an image signal which is an analog signal in consequence of shooting. The video processor 73 performs processes such as A/D (Analog/Digital) conversion and adjusting an image for the image signal from the shooting part 72. The video processor 73 supplies image data that is the resulted digital data to the video coding part 74 or the video processor I/F 76.

The video coding part 74 compresses and encodes image data from the video processor 73 in accordance with MPEG (Moving Picture Experts Group) 2 system, for example, and supplies the resulted image data to the video I/F 75.

The video I/F 75, the video processor I/F 76, the camera controller I/F 78, the viewfinder I/F 79, the manipulation part I/F 82, the microcomputer 83, and the recorder I/F 84 are connected to one another through the bus 85.

The video I/F 75 supplies image data supplied from the video coding part 74 to the recorder I/F 84 through the bus 85. The video processor I/F 76 supplies image data supplied from the video processor 73 to the viewfinder I/F 79 through the bus 85.

The camera controller 77 controls the shooting part 72 to control a diaphragm and zooming based on a control signal supplied from the camera controller I/F 78. The camera controller I/F 78 supplies the control signal supplied from the microcomputer 83 through the bus 85 to the camera controller 77.

The viewfinder I/F 79 supplies image data supplied from the video processor I/F 76 or the recorder I/F 84, or various items of metadata supplied from the recorder I/F 84 to the viewfinder 80. The viewfinder 80 displays an image corresponding to image data or metadata supplied from the viewfinder I/F 79.

The manipulation part 81 accepts user manipulation to the camera block 51 (for example, an instruction for shooting), and supplies a camera manipulation signal that indicates the manipulation to the manipulation part I/F 82. The manipulation part I/F 82 supplies the camera manipulation signal supplied from the manipulation part 81 to the microcomputer 83 through the bus 85.

For example, the microcomputer 83 is configured of a CPU (Central Processing Unit), a ROM (Read Only Memory), and a RAM (Random Access Memory) The CPU of the microcomputer 83 runs a program stored in the ROM to control each part in the camera block 51 based on the camera manipulation signal from the manipulation part 81. For example, the CPU supplies the control signal to the camera controller 77 through the bus 85 and the camera controller I/F 78, and controls a diaphragm and zooming. In addition, the RAM of the microcomputer 83 properly stores a program and data run by the CPU therein.

The recorder I/F 84 exchanges data with the recorder block 52. For example, the recorder I/F 84 supplies image data or metadata supplied from a camera I/F 109 in the recorder block 52 to the viewfinder I/F 79 through the bus 85. In addition, the recorder I/F 84 supplies image data supplied from the video I/F 75 to the recorder block 52.

The recorder block 52 is configured of an audio processor 100, an audio coding part 101, an audio I/F 102, an audio processor I/F 103, a speaker I/F 104, an audio decoding part 105, a microcomputer 106, a material memory I/F 107, a material memory 108, the camera I/F 109, an LCD (Liquid Crystal Display) I/F 110, a video decoding part 111, an LCD 112, a medium I/F 113, a communication block I/F 114, and a bus 115, and the block records material data such as image data acquired by the camera block 51 and sound data corresponding to a sound signal that is an analog signal acquired by the microphone 55.

The audio processor 100 performs processes such as A/D conversion and adjusting sounds for the sound signal supplied from the microphone 55. The audio processor 100 supplies sound data (audio data) that is the resulted digital data to the audio coding part 101 and the audio processor I/F 103. The audio coding part 101 compresses and encodes sound data supplied from the audio processor 100 in the system corresponding to the linear PCM (Pulse Code Modulation) format, for example, and supplies the resulted sound data to the audio I/F 102.

The audio I/F 102, the audio processor I/F 103, the speaker I/F 104, the microcomputer 106, the material memory I/F 107, the camera I/F 109, the LCD I/F 110, the medium I/F 113, and the communication block I/F 114 are connected to one another through the bus 115.

The audio I/F 102 supplies sound data supplied from the audio coding part 101 to the material memory 108 or the medium I/F 113 through the bus 115. The audio processor I/F 103 supplies sound data supplied from the audio processor 100 to the speaker I/F 104 as it is through the bus 115.

The speaker I/F 104 supplies sound data supplied from the audio processor I/F 103, the material memory I/F 107, or the medium I/F 113 to the audio decoding part 105. The audio decoding part 105 decodes sound data as necessary. The audio decoding part 105 supplies the resulted sound data to the speaker 56, and outputs sounds corresponding to the sound data from the speaker 56.

For example, the microcomputer 106 is configured of a CPU, a ROM, and a RAM. The CPU of the microcomputer 106 runs a program stored in the ROM to control each part in the recorder block 52 based on a communication manipulation signal that is supplied from the communication block I/F 114 and indicates user manipulation of the manipulation part 131.

For example, the CPU of the microcomputer 106 creates metadata of material data (non-real time metadata and grouping metadata, described later) based on information about recording and various set values supplied from the medium I/F 113, etc.

In addition, the CPU of the microcomputer 106 creates disk metadata that is metadata of the entire data recorded on the removable medium 33, and other data.

Furthermore, based on image data supplied from the camera I/F 109, the CPU of the microcomputer 106 creates proxy image data that has a lower resolution than that of the image data.

Furthermore, the CPU of the microcomputer 106 controls recording or reproduction over the material memory 108 and the removable medium 33.

In addition, the microcomputer 106 records and reproduces data in the material memory 108 or the removable medium 33 at the same time as necessary. At this time, the microcomputer 106 can reproduce data already recorded in a file currently recorded in the material memory 108 or the removable medium 33.

In addition, the CPU of the microcomputer 106 creates image data to display various screens, and supplies them to the LCD I/F 110. Furthermore, the RAM of the microcomputer 106 properly stores a program and data run by the CPU therein.

The material memory I/F 107 has fast access to the material memory 108, for example, and records or reproduces data from the material memory 108.

For example, under control by the microcomputer 106, the material memory I/F 107 supplies material data to the material memory 108, and stores the data as a file therein. In addition, under control by the microcomputer 106, the material memory I/F 107 supplies proxy image data to the material memory 108, and stores it as a file therein. Furthermore, under control by the microcomputer 106, the material memory I/F 107 supplies metadata (such as metadata of material data and disk metadata) to the material memory 108, and stores it as a file therein.

In addition, the material memory I/F 107 reproduces material data from the material memory 108, and supplies sound data in the material data to the speaker I/F 104 and image data to the LCD I/F 110.

The camera I/F 109 is connected to the recorder I/F 84 in the camera block 51, and receives image data from the recorder I/F 84, for example. The camera I/F 109 supplies the image data to the microcomputer 106 through the bus 115 as well as supplies the image data to the material memory I/F 107 or the medium I/F 113. The LCD I/F 110 supplies the image data supplied from the material memory I/F 107 or the medium I/F 113 to the video decoding part 111.

The video decoding part 111 decodes the image data supplied from the LCD I/F 110 as necessary, and supplies the resulted image data to the LCD 112. The LCD 112 displays an image corresponding to the image data supplied from the video decoding part 111.

Under control by the microcomputer 106, the medium I/F 113 supplies the material data to the removable medium 33, and stores it as a file. In addition, under control by the microcomputer 106, the medium I/F 113 supplies proxy image data to the removable medium 33, and stores it as a file. Furthermore, under control by the microcomputer 106, the medium I/F 113 supplies metadata (such as metadata of material data and disk metadata) to the removable medium 33, and stores it as a file therein.

Moreover, the medium I/F 113 reads information about recording and various set values recorded on the removable medium 33 mounted on the video camera 21, and supplies them to the microcomputer 106.

In addition, here, it is supposed that information about recording, various set values and other data are inputted from the removable medium 33 to the microcomputer 106 through the medium I/F 113. However, this scheme may be done in which a user manipulates the manipulation part 131 to enter information about recording, various set values and other data to the microcomputer 106.

In addition, the medium I/F 113 reproduces material data recorded in the removable medium 33 and acquired by the video camera 21 or another video camera, and supplies sound data in the material data to the speaker I/F 104 and image data to the LCD I/F 110. Furthermore, the medium I/F 113 reproduces material data, proxy image data, metadata and other data from the removable medium 33, and supplies them to the communication block I/F 114.

The communication block I/F 114 is connected to a recorder I/F 135 (described later) in the communication block 53, and exchanges data with the communication block 53. In addition, the communication block I/F 114 supplies a communication manipulation signal supplied from the recorder I/F 135 to the microcomputer 106 through the bus 115. Furthermore, the communication block I/F 114 supplies material data, proxy image data, metadata and other data supplied from the material memory I/F 107 or from the medium I/F 113 to the recorder I/F 135.

The communication block 53 is configured of a manipulation part 131, a manipulation part I/F 132, a power source part I/F 133, a microcomputer 134, the recorder I/F 135, a network I/F 136, and a bus 137, and the block communicates data with the other devices through the access point 23, the network 31 and the other devices shown in FIG. 1 as well as controls the power source in the recorder block 52.

The manipulation part 131 accepts a manipulation (for example, an instruction for reproduction) to the recorder block 52 and the communication block 53, and supplies a communication manipulation signal indicating that manipulation to the manipulation part I/F 132. The manipulation part I/F 132, the power source part I/F 133, the microcomputer 134, the recorder I/F 135, and the network I/F 136 are connected to one another through the bus 137.

The manipulation part I/F 132 supplies the communication manipulation signal supplied from the manipulation part 131 to the microcomputer 134 or the recorder I/F 135 through the bus 137. The power source part I/F 133 supplies a power source control signal that is supplied from the microcomputer 134 through the bus 137 and controls the supply of power to the recorder block 52 to the communication block I/F 152 in the power source block 54.

For example, the microcomputer 134 is configured of a CPU, a ROM, and a RAM. The CPU of the microcomputer 134 runs a program stored in the ROM to control each part in the communication block 53 based on a communication manipulation signal supplied from the manipulation part 13. For example, the microcomputer 134 decides the destination of the material data based on metadata supplied through the recorder I/F 135, and supplies the material data to the network I/F 136. In addition, the CPU of the microcomputer 134 creates a power source control signal based on a detection signal that is supplied from the network I/F 136 and shows the detected result of the access point 23, and supplies it to the power source part I/F 133.

The RAM of the microcomputer 134 stores a program and data run by the CPU therein. For example, the RAM temporarily stores material data, proxy image data, or metadata therein that is supplied through the recorder I/F 135 and is transmitted over the network I/F 136. Thus, even when the reproduction rate of these items of data from the removable medium 33 exceeds the transmission rate, data can be surely transmitted.

The recorder I/F 135 is connected to the communication block I/F 114 in the recorder block 52, and supplies a communication manipulation signal supplied from the manipulation part 132, for example, to the communication block I/F 114. In addition, the recorder I/F 135 supplies material data, proxy image data, metadata and other data supplied from the communication block I/F 114 to the microcomputer 134 through the bus 137.

The network I/F 136 communicates with the other devices (for example, the material using unit 29, etc.) through the access point 23, the network 31 and other devices shown in FIG. 1 in conformity with the FTP (File Transfer Protocol). For example, the network I/F 136 transmits material data, proxy image data, metadata and other data supplied from the recorder I/F 135 to another device that is the destination supplied from the microcomputer 134 in order of metadata, proxy image data, and material data through the access point 23, the network 31 and other devices. In addition, the network I/F 136 detects the access point 23, and supplies a detection signal that indicates the detected result to the microcomputer 134.

The power source block 54 is configured of a power source part 151 and a communication block I/F 152, and supplies power (electric power) to the camera block 51, the recorder block 52, the communication block 53, the microphone 55, and the speaker 56.

The power source part 151 controls the supply of power to the recorder block 52 based on a power source control signal supplied from the communication block I/F 152. The communication block I/F 152 supplies the power source control signal supplied from the power source part I/F 133 in the communication block 53 to the power source part 151.

Figure 4:
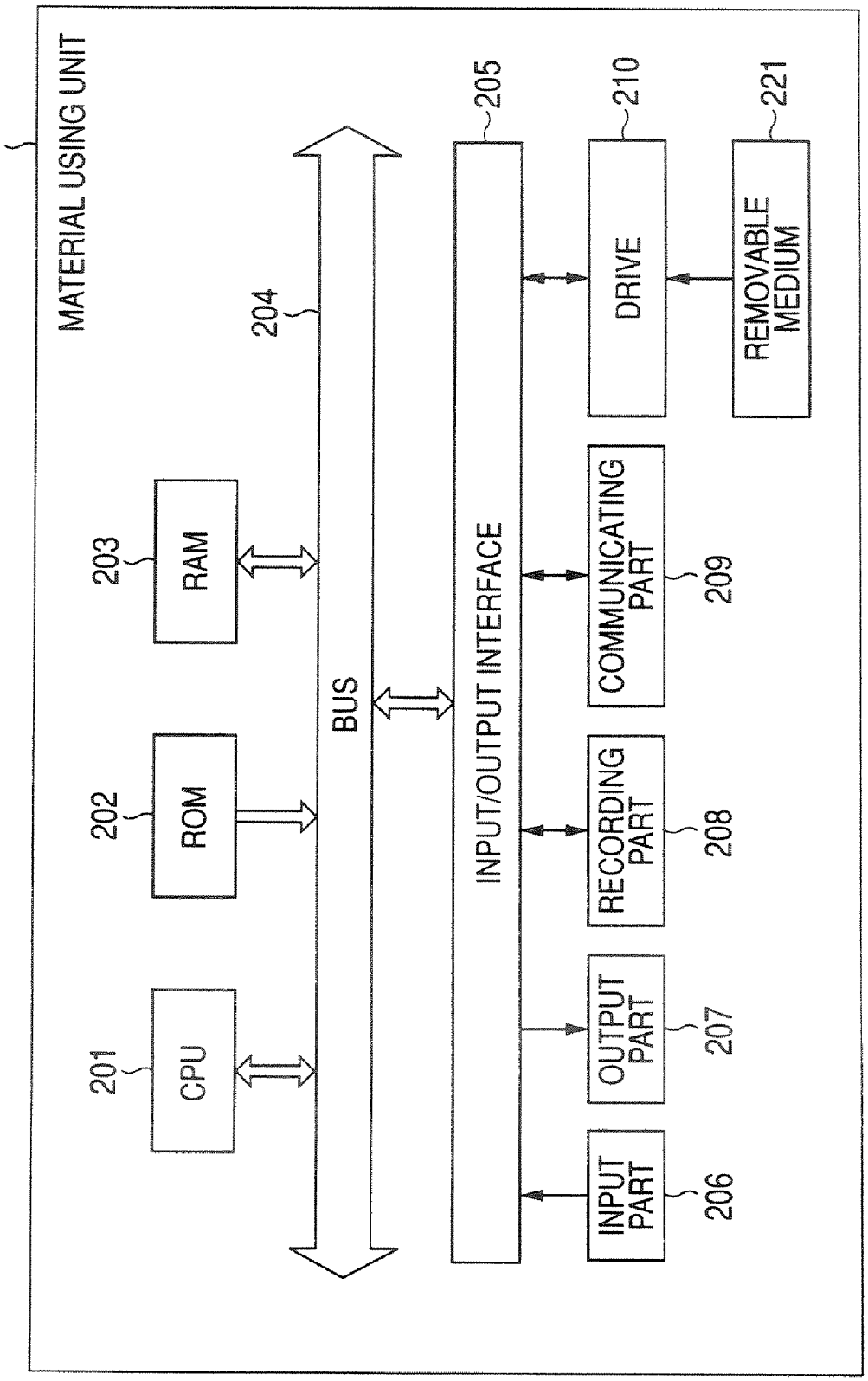
FIG. 4 shows a block diagram depicting an exemplary hardware configuration of a material using unit shown in FIG. 1.

FIG. 4 shows a block diagram depicting an exemplary hardware configuration of the material using unit 29 shown in FIG. 1.

The CPU 201 executes various processes in accordance with programs recorded in a ROM 202, or a recording part 208. A RAM 203 properly stores programs and data run by the CPU 201 therein. The CPU 201, the ROM 202, and the RAM 203 are connected to one another with a bus 204.

To the CPU 201, an input/output interface 205 is connected through the bus 204. To the input/output interface 205, connected are an input part 206 configured of a receiving part which receives instructions transmitted from a keyboard, a mouse, a microphone, and a remote controller, not shown, and an output part 207 configured of a display and a speaker. The CPU 201 executes various processes in response to the instruction inputted from the input part 206. Then, the CPU 201 outputs the processed result to the output part 207. For example, the CPU 201 creates image data to display various screens, and allows the output part 207 to display them.

The recording part 208 connected to the input/output interface 205 is configured of a hard disk, for example, and records programs and various items of data run by the CPU 201. The communicating part 209 communicates with external devices through the intranet 32. In addition, the communicating part 209 may acquire a program through the intranet 32 to record it in the recording part 208.

A drive 210 connected to the input/output interface 205 drives a removable medium 211 such as a magnetic disc, an optical disc, a magneto-optical disc, or a semiconductor memory when it is mounted, and acquires a program and data recorded thereon. The acquired program or data is forwarded to the recording part 208, and recorded as necessary.

Figure 5:
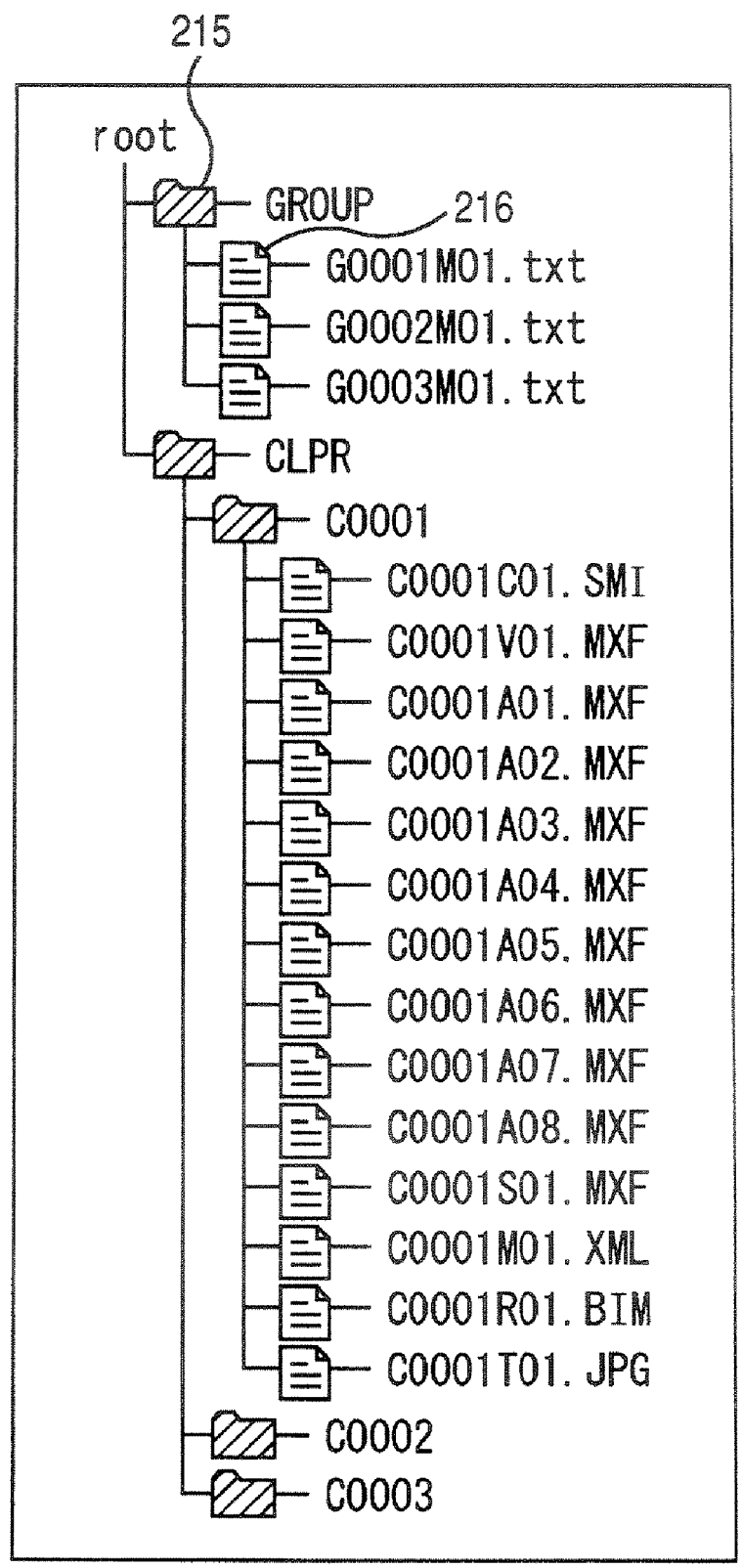
FIG. 5 shows a diagram depicting an exemplary screen for displaying the directory structure of files recorded on a removable medium.

FIG. 5 shows a diagram depicting an exemplary screen for displaying the directory structure of the files that is recorded on the removable medium 33 shown in FIG. 1 and displayed on the LCD 112 shown in FIG. 3.

In FIG. 5, a symbol 215 depicts a single directory. In addition, although no numerals and signs are shown, the other symbols that are the same as the symbol (the directory) 215 also depict a single directory. In addition, the symbol 216 depicts a single file. In addition, although no numerals and signs are shown, the other symbols that are the same as the symbol (file) 216 also depict a single file.

In addition, hereinafter, it is considered that the directory is the same as the symbol of the directory for discussion, as long as not particularly specified. Similarly, it is considered that the file is the same as the symbol of the file for discussion, as long as not particularly specified. In addition, in order to easily distinguish between the individual directories and between the individual files, hereinafter, names thereof are described in brackets after the file or the directory.

In the example shown in FIG. 5, a GROUP directory 215 and a clip root directory (CLPR) are disposed on the removable medium 33.

In the GROUP directory 215, grouping metadata files 216 (G0001M01.txt to G0003M01.txt) are placed which are files of grouping metadata (described later in FIGS. 6 and 7) for a group of each of the recording IDs of all the clips recorded in the removable medium 33 (the detail of the clip will be described later).

More specifically, for example, FIG. 5 shows the example in which data of clips corresponding to three recording IDs is recorded on the removable medium 33. Groups of grouping metadata for the three recording IDs are separated and recorded in three files, a first grouping metadata file (G0001M01.txt), a second grouping metadata file (G002M01.txt), and a third grouping metadata file (G0003M01.txt).

In addition, in the clip root directory (CLPR), data of clips recorded in the removable medium 33 is separated into different directories for every clip for management.

In addition, the clip is a unit of the number of times for the shooting process done by the video camera 21. Other than this, the clip represents a unit showing the time from the start to the end of shooting in the shooting process, or a unit showing the length of various items of data obtained by the shooting process, or a unit showing the data volume of various items of data obtained by the shooting process. Furthermore, the clip sometimes shows an assembly of various items of data itself.

Here, for example, the clip represents an assembly of image data obtained by a single shooting process (the shooting process from the start to the end of shooting), sound data corresponding to the image data, metadata and other data.

More specifically, for example, FIG. 5 shows an example in which items of clip data of three clips are recorded on the removable medium 33. Three items of clip data are separated and managed in three directories, a first clip directory (C0001), a second clip directory (C0002), and a third clip directory (C0003).

In other words, for example, the items of data of the first clip recorded on the removable medium 33 are managed as files below the first clip directory (C0001).

More specifically, for example, as shown in FIG. 5, the first clip directory (C0001) is provided with a master file (C0001C01.SMI) that is a file to manage the clip, an image file (C0001V01.MXF) that is a file to contain image data of the clip, eight sound files (C0001A01.MXF to C0001A08.MXF) that are files to contain sound data of each channel of the clip, a proxy image data file (C0001S01.MXF) that is a file to contain proxy image data of the clip, a non-real time metadata file (C0001M01.XML) that is a file to contain a type and a device ID of a device that acquires the clip (for example, the video camera), a camera set value when the clip is shot (acquired), and metadata that is not demanded for being real time on the date and time to shoot (hereinafter, called non-real time metadata), and a real time metadata file (C0001R01.BIM) that is a file to contain metadata that is demanded for being real time of the clip (hereinafter, called real time metadata).

As described above, in the example shown in FIG. 5, image data, proxy image data, and real time metadata that are data demanded for being real time in reproduction are each managed as a single file so as not to increase readout time.

In addition, as described above, although sound data is also demanded for being real time in reproduction, 8 channels are prepared for multi-channel sounds such as 7.1 channels, and the individual channels are managed as different files. In other words, here, it is described that sound data is managed as eight files, but it is not limited thereto. The number of files corresponding to sound data may be seven or under, or 9 or above.

Similarly, image data, proxy image data, and real time metadata may be managed as two or more files depending on situations.

In addition, in the example shown in FIG. 5, the non-real time metadata file (C0001M01.XML) is described in the XML format for providing general versatility, but the real time metadata file (C0001R01.BIM) is a file in the BIM (Binary format for MPEG-7 data) format in which files in the XML format are compiled in order to reduce load necessary for processing time and processes of the reproduction process.

The exemplary configuration of files in the first clip directory (C0001) described above can be adapted to all the clip directories, that is, in the example shown in FIG. 5, the similar exemplary configuration of files can be adapted to the second clip directory (C0002) and the third clip directory (C0003). Therefore, the descriptions for the directories are omitted.

Next, grouping metadata will be described with reference to FIGS. 6 and 7.

FIG. 6 shows exemplary items of the contents of grouping metadata.

In the example shown in FIG. 6, the items of the contents of grouping metadata are "group title", "recording ID", "category", "original", "date and time to create groups", "destination", "date and time to shoot", "shooting location", "person to shoot", "contents to shoot", and "shot material (file)".

The content of the item "group title" is a title showing the recording contents of a group, and the content of the item "recording ID" is a recording ID acquired from the NRC at Step S2 shown in FIG. 2. The content of the item "category" is a type of a clip categorized into the group. The content of the item "original" is information showing that the clip categorized into the group is original recorded data as data of the clip categorized into the group data is unchanged or that the clip categorized into the group is processed data after recorded. The content of the item "date and time to create groups" is date and time when grouping metadata is created.

The item "destination" is configured of the item "name", the item "E-mail address", and the item "website URL (Uniform Resource Locator)". The content of the item "name" is a name of the destination of the clip categorized into the group. The content of the item "E-mail address" is an E-mail address of the destination. The content of the item "website URL" is a website URL of the destination.

In addition, a plurality of E-mail addresses may be described as the content of the item "E-mail address". In addition, a plurality of website URLs may be described as the content of the item "website URL".

The item "date and time to shoot" is configured of the item "scheduled" and the item "carried out". The content of the item "scheduled" is information about recording date and time considered at Step S3 shown in FIG. 2, and the content of the item "carried out" is information about actual recording date and time. The item "shooting location" is configured of the item "scheduled" and the item "carried out". The content of the item "scheduled" is information about the recording site considered at Step S3, and the content of the item "carried out" is information about an actual recording site. For example, the actual recording site is position information showing the current position of the video camera 21 which is acquired by a GPS (Global Positioning System), not shown, disposed in the video camera 21 when recorded.

The item "person to shoot" is configured of the item "scheduled" and the item "carried out". The content of the item "scheduled" is a name of the recording person decided at Step S4. The content of the item "carried out" is a name of an actual recording person. The content of the item "contents to shoot" is configured of the item "instruction" and the item "actual contents (notes)". The content of the item "instruction" is information about recording contents such as a recording plan. The content of the item "actual contents (notes)" is information about actual recorded contents.

The item "shot material" is configured of the item "title", the item "UMID (Unique Material Identifier)", the item "notes", and the item "transmission history". The content of the item "title" is titles of clip directories (C0001 to C0003) of the clips categorized into the group, and the content of the item "UMID" is a UMID of a clip (the detail will be described later). The content of the item "notes" is a given item of information inputted by a user, and the content of the item "transmission history" is information showing the existence of transmission of the clips categorized into the group. In addition, when there are multiple destinations, for information showing the existence of transmission, destination E-mail addresses and website URLs that are already transmitted may be described.

In addition, the UMID is an identifier unique to a clip for identifying each of clips in a globally unique manner, which expresses an identifier defined by the SMPTE (Society of Motion Picture and Television Engineers). For example, the UMID is contained in an image file and non-real time metadata.

FIG. 7 shows exemplary grouping metadata described in a text format. In addition, in FIG. 7, the contents of the items are all "XXXX".

In grouping metadata shown in FIG. 7, the contents of the item are described after the item, and the item is marked from the contents of the item by ", (comma)".

More specifically, in the example shown in FIG. 7, after "title" showing the item "group title", "XXXX" that is the contents of the item "group title" is described. Then, after that, "category" showing the item "category", "XXXX" that is the contents of the item "category", "original" showing the item "original", and "XXXXX" that is the contents of the item "original" are sequentially described.

Similarly after that, "date created" showing the item "date and time to create groups", "XXXX" that is the contents of the item "date and time to create groups", "transmit to" showing the item "name" in the item "destination", "XXXX" that is the contents of the item "name", "e-mail address" showing the item "E-mail address" in the item "destination", "XXXX" showing the contents of the item "E-mail address", "site URL" showing the item "website URL" in the item "destination", and "XXXX" showing the contents of the item "website URL" are sequentially described.

In addition, after that, "date directed" showing the item "scheduled" in the item "date and time to shoot", "XXXX" that is the contents of the item "scheduled", "date carried out" showing the item "carried out" in the item "date and time to shoot", "XXXX" that is the contents of the item "carried out", "place directed" showing the item "scheduled" in the item "shooting location", "XXXX" that is the contents of the item "scheduled", "place carried out" showing the item "carried out" in the item "shooting location", "XXXX" that is the contents of the item "carried out" are sequentially described.

Furthermore, after that, "person directed" showing the item "scheduled" in the item "person to shoot", "XXXX" that is the contents of the item "scheduled", "person carried out" showing the item "carried out" in the item "person to shoot", "XXXX" that is the contents of the item "carried out", "description directed" showing the item "instruction" in the item "contents to shoot", "XXXX" that is the contents of the item "instruction", "description occurred" showing the item "actual contents (notes)" in the item "contents to shoot", and "XXXX" that is the contents of the item "actual contents (notes)" are sequentially described.

In addition, after that, "file title" showing the item "title" in the item "shot material (file)", "XXXX" that is the title of the first file of the clip categorized into the group in the contents of the item "title", "file ID" showing the item "UMID" in the item "shot material (the file)", "XXXX" that is the UMID of the first file in the contents of the item "UMID", "memo" showing the item "notes" in the item "shot material (file)", and "XXXX" that is that is the contents of the item "notes" are sequentially described.

Then, after that, as similar to the first file, the item "title", the item "UMID", and the item "notes", and the contents thereof of the second and third files are described.

FIG. 8 shows an exemplary screen displaying the directory structure of the files that are displayed on the output part 207 (FIG. 4) of the material using unit 29 shown in FIG. 4 and recorded in the recording part 208.

In addition, the directory shown in FIG. 8 is created by the editing operator to perform creation work at Step S7 shown in FIG. 2.

As shown in FIG. 8, in the recording part 208, a program directory 231 is disposed, and at the lower level of the program directory 231, the files of the clips configuring the television program are arranged. In the example shown in FIG. 8, in the program directory 231, the files of clips configuring a twelve o'clock news program on Aug. 15, 20XX are arranged in a lower directory.

In the program directory 231, a news A directory 232 corresponding to the frame in the news program is arranged, and in the news A directory 232, the clips configuring news A are managed as separated into grouped directories for each of the recording contents.

In the example shown in FIG. 8, in the news A directory 232, two grouped clips are recorded. In the news A directory 232, a clip group directory 233 for the directory of a first group and a clip group directory 234 for the directory of a second group are arranged.

In addition, for names of the clip group directories 233 and 234, for example, used are the contents of the item "recording ID" (FIG. 6) of grouping metadata of the corresponding first and second groups (in the example shown in FIG. 8, the recording ID 1001 and the recording ID 1002) and the contents of the item "group title" (in the example shown in FIG. 8, group titles A and B in brackets).

At the lower level of the clip group directories 233 and 234, the directories of clips categorized into the corresponding first and second groups are arranged. In the example shown in FIG. 8, below the clip group directory 234, clip directories 235 and 236 of clips categorized into the second group are arranged.

The clip directories 235 and 236 are files in which the clips of the clip directories (C0001 and C0002) shown in FIG. 5 and recorded on the removable medium 33 are transmitted to the material using unit 29 and recorded therein.

In addition, hereinafter, when it is unnecessary to distinguish between the clip group directories 233 and 234, they are collectively called the clip group directory 234. In addition, when it is unnecessary to distinguish between the clip directories 235 and 236, they are collectively called the clip directory 235.

Figure 9:
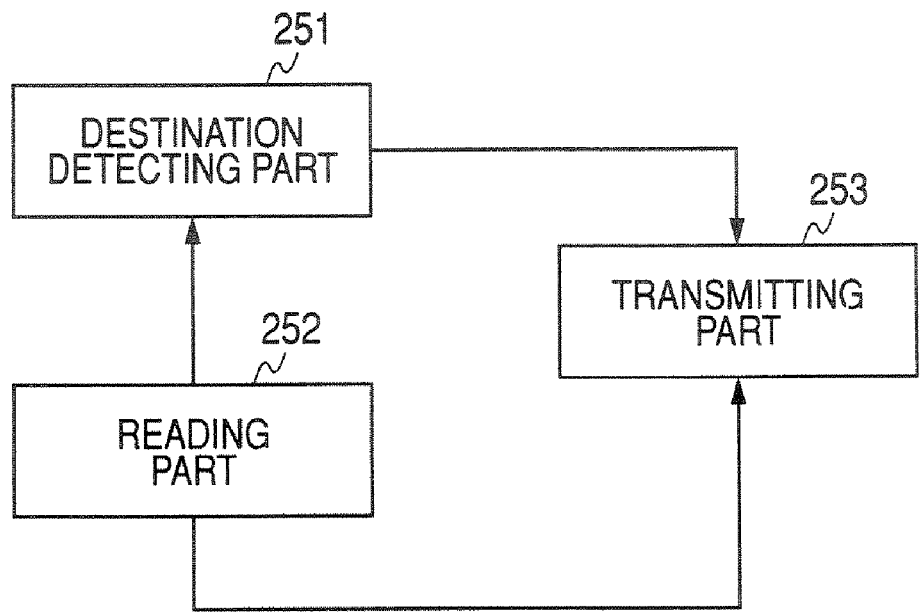
FIG. 9 shows a block diagram depicting an exemplary functional configuration of a video camera.

FIG. 9 shows a block diagram depicting an exemplary functional configuration of the video camera 21 shown in FIG. 3.

The video camera 21 shown in FIG. 9 is configured of a destination detecting part 251, a reading part 252, and a transmitting part 253. In addition, for example, the destination detecting part 251 and the transmitting part 253 correspond to the microcomputer 134 shown in FIG. 3, and for example, the reading part 252 corresponds to the recorder block 52.

The destination detecting part 251 detects (extracts) the destination URL based on the item "website URL" in the item "destination" in the grouping metadata file 216 supplied from the reading part 252. In addition, the destination detecting part 251 extracts the recording ID that is the contents of the item "recording ID" from the grouping metadata file 216. Then, the destination detecting part 251 supplies the URL and the recording ID to the transmitting part 253.

The reading part 252 reads the clip directories (C0001 to C0003) and the grouping metadata file 216 that are the transmission targets out of the removable medium 33, and supplies the grouping metadata file 216 to the destination detecting part 251 and the clip directory to the transmitting part 253. The transmitting part 253 transmits the recording ID from the destination detecting part 251 and the clip directories from the reading part 252 to the material using unit 29 corresponding to the URL based on the URL from the destination detecting part 251.

Figure 10:
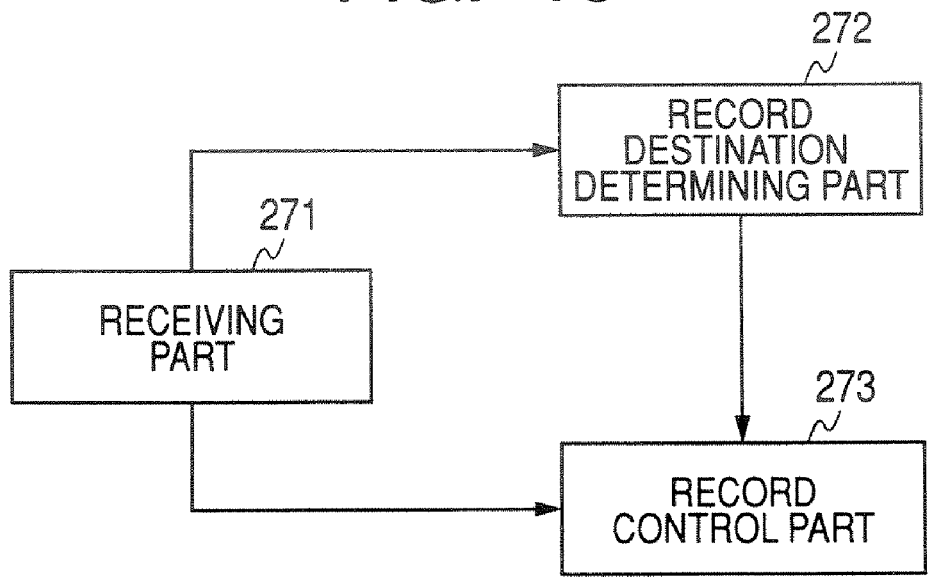
FIG. 10 shows a block diagram depicting an exemplary functional configuration of a material using unit.

FIG. 10 shows a block diagram depicting an exemplary functional configuration of the material using unit 29 shown in FIG. 4.

The material using unit 29 shown in FIG. 10 is configured of a receiving part 271, a record destination determining part 272, and a record control part 273. In addition, for example, the receiving part 271 corresponds to the communicating part 209 shown in FIG. 4, and for example, the record destination determining part 272 and the record control part 273 correspond to the CPU 201.

The receiving part 271 receives the recording ID and the clip directories transmitted from the transmitting part 253 of the video camera 21. The receiving part 271 supplies the recording ID to the record destination determining part 272, and the clip directories to the record control part 273.

The record destination determining part 272 decides the clip group directory 234 (FIG. 8) that is the record destination based on the recording ID from the receiving part 271. Then, the record destination determining part 272 supplies information showing the clip group directory 234 decided as the record destination to the record control part 273.

The record control part 273 records the clip directories from the receiving part 271 in the clip group directory 234 shown by the information from the record destination determining part 272.

Next, a transmission process in which the video camera 21 transmits clips will be described with reference to FIG. 11. For example, the transmission process is started when a user manipulates the manipulation part 131 to specify a transmission target.

At Step S21, the reading part 252 shown in FIG. 9 reads the grouping metadata file 216 of clips that are the transmission target specified by the user out of the removable medium 33, and supplies it to the destination detecting part 251, and the process goes to Step S22. At Step S22, the destination detecting part 251 extracts the URL that is the contents of the item "website URL" of grouping metadata in the grouping metadata file 216, and supplies the URL as the destination to the transmitting part 253.

After the process at Step S22, the process goes to Step S23. The destination detecting part 251 extracts the recording ID that is the contents of the item "recording ID" of grouping metadata, and supplies it to the transmitting part 253, and the process goes to Step S24. At Step S24, the reading part 252 reads the clip directories (C0001 to C0003) of the clips that are the transmission target out of the removable medium 33, and supplies them to the transmitting part 253, and the process goes to Step S25.

At Step S25, the transmitting part 253 transmits the recording ID to the material using unit 29 corresponding to the URL based on the URL and the recording ID supplied from the destination detecting part 251.

After the process at Step S25, the process goes to Step S26. The transmitting part 253 determines whether the material using unit 29 makes a request for transmitting the clips that are the transmission target. When it is determined that the request for transmission is not made, the transmitting part 253 waits until the request is made.

On the other hand, at Step S26, when it is determined that the request for transmission is made, the process goes to Step S27. The transmitting part 253 transmits the clip directories supplied from the reading part 252, that is, data of the clips that are the transmission target to the material using unit 29 corresponding to the URL from the destination detecting part 251, and the process goes to Step S28.

At Step S28, the transmitting part 253 determines whether the transmission is finished, that is, whether all the clips that are the transmission target are transmitted. When it is determined that the transmission is not finished, the process returns to Step S27 to repeat the process steps described above. On the other hand, at Step S28, when it is determined that the transmission is finished, the process is ended.

In addition, when a plurality of website URLs are described as the contents of the item "website URL", Steps S25 to S28 are performed for each URL.

Next, a reception process in which the material using unit 29 receives clips will be described with reference to FIG. 12.

At Step S41, the receiving part 271 shown in FIG. 10 determines whether the recording ID transmitted from the transmitting part 253 of the video camera 21 is received. When it determines that the recording ID is not received, it waits until the recording ID is received.

On the other hand, at Step S41, when the receiving part 271 determines that the recording ID is received, it supplies the recording ID to the record destination determining part 272, and the process goes to Step S42. At Step S42, the record destination determining part 272 decides the clip directory 234 associated with the recording ID as the record destination of the transmission target based on the recording ID supplied from the receiving part 271. Then, the record destination determining part 272 supplies information showing the clip group directory 234 decided as the record destination to the record control part 273.

After the process at Step S42, the process goes to Step S43. The receiving part 271 makes a request to the transmitting part 253 of the video camera 21 for transmitting the transmission target, and the process goes to Step S44. At Step S44, the receiving part 271 receives the clip directories (C0001 to C0003) transmitted from the transmitting part 253 at Step S27 shown in FIG. 11, and supplies them to the record control part 273, and the process goes to Step S45.

At Step S45, the record control part 273 records the clip directories supplied from the receiving part 271 in the clip group directory 234 shown by information supplied from the record destination determining part 272, and the process goes to Step S46. At Step S46, the receiving part 271 determines whether the reception of the clip directories transmitted from the transmitting part 253 is all finished. When it is determined that the reception is not finished, the process returns to Step S44 to repeat the process steps described above.

On the other hand, at Step S45, when it is determined that the reception is finished, the process returns to Step S41 to repeat the process steps described above.

Next, communications between the video camera 21 and the material using unit 29 will be described with reference to FIGS. 13 to 15.

Figure 13:
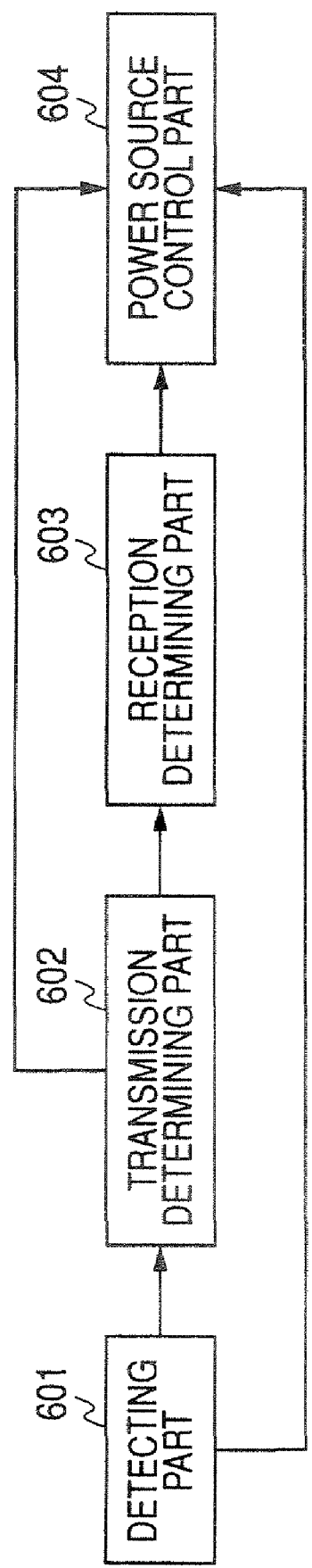
FIG. 13 shows a block diagram depicting an exemplary configuration of functions to communicate with the material using unit.

FIG. 13 shows a block diagram depicting an exemplary configuration of the functions in the video camera 21 conducting communications with the material using unit 29. In other words, FIG. 13 shows the configuration of all or a part of the functions of the transmitting part 253 shown in FIG. 9.

The video camera 21 shown in FIG. 13 is configured of a detecting part 601, a transmission determining part 602, a reception determining part 603, and a power source control part 604. In addition, for example, the detecting part 601, the transmission determining part 602, the reception determining part 603, and the power source control part 604 correspond to the microcomputer 134 shown in FIG. 3.

The detecting part 601 detects the access point 23, and supplies the detected result to the transmission determining part 602. The transmission determining part 602 transmits data to be transmitted (for example, recording ID, data of each of the clips, etc.) to the material using unit 29 in response to the detected result from the detecting part 601. The transmission determining part 602 informs the power source control part 604 that there is data to be transmitted, and informs the reception determining part 603 that the transmission is finished or that there is no data to be transmitted.

The reception determining part 603 receives data transmitted from the material using unit 29 (for example, the transmission request etc.) in response to the notification from the transmission determining part 602. The reception determining part 603 informs the power source control part 604 that there is data transmitted from the material using unit 29, and that the reception of data is finished, or that there is no data transmitted from the material using unit 29.

The power source control part 604 creates a power source control signal that controls the supply of power to the recorder block 52 in response to the detected result from the detecting part 601, or the notification from the transmission determining part 602 or the reception determining part 603, and supplies it to the power source block 54.

Next, a power source control process in which the video camera 21 controls the supply of power to the recorder block 52 will be described with reference to FIG. 14. For example, the power source control process is started when the power source of the video camera 21 is turned on, that is, when the power source is supplied to the power source part 151.

At Step S601, the detecting part 601 detects the access point 23 shown in FIG. 1, and supplies the detected result to the transmission determining part 602, and the process goes to Step S602. At Step S602, the detecting part 601 determines whether the access point 23 can be detected, and supplies the determined result to the transmission determining part 602. When the detecting part 601 determines that the access point 23 is unable to be detected at Step S601, it waits until the access point 23 can be detected.

On the other hand, when it determines that the access point 23 can be detected at Step S602, the process goes to Step S603. The transmission determining part 602 starts connection to the network 31 via the access point 23, and the process goes to Step S604.

At Step S604, the transmission determining part 602 makes a request to the material using unit 29 for starting communications, and the process goes to Step S605.

At Step S605, the transmission determining part 602 determines whether there is data to be transmitted. When it determines that there is data to be transmitted, the process goes to Step S606.

At Step S606, the power source control part 604 creates a power source control signal so as to turn on the power source of the recorder block 52, supplies it to the power source block 54, and then turns on the power source of the recorder block 52, and the process goes to Step S607. At Step S607, the transmission determining part 602 notifies the material using unit 29 that there is data to be transmitted, and the process goes to Step S608.

At Step S608, the transmission determining part 602 transmits data to be transmitted to the material using unit 29, and the process goes to Step S609. At Step S609, the transmission determining part 602 determines whether the transmission of data to be transmitted is all finished. When it determines that the transmission of data to be transmitted is not all finished, the process returns to Step S608 to repeat the process steps described above.

At Step S609, when it determines that the transmission of data to be transmitted is all finished, the process goes to Step S610. The reception determining part 603 determines whether there is data to be received, that is, whether there is data to be transmitted from the material using unit 29. At Step S610, when it is determined that there is no data to be received, the process goes to Step S611. The power source control part 604 creates a power source control signal so as to turn off the power source of the recorder block 52, supplies it to the power source block 54, and then turns off the power source of the recorder block 52, and the process is ended.

On the other hand, at Step S605, when it is determined that there is no data to be transmitted, the process goes to Step S612. The transmission determining part 602 notifies the material using unit 29 that there is no data to be transmitted, and the process goes to Step S613.

At Step S613, the reception determining part 603 determines whether there is data to be received, that is, whether there is data to be transmitted from the material using unit 29. When it determines that there is data to be received, the process goes to Step S614.

At Step S614, the power source control part 604 turns on the power source of the recorder block 52, and the process goes to Step S615. At Step S615, the reception determining part 603 receivers data transmitted from the material using unit 29, and the process goes to Step S616.

At Step S616, the reception determining part 603 determines whether the reception of data transmitted from the material using unit 29 is all finished. When it determines that the reception of data is not all finished, the process returns to Step S615 to repeat the process steps described above.

On the other hand, at Step S616, when it is determined that the reception of data transmitted from the material using unit 29 is all finished, the process goes to Step S611. As described above, the power source control part 604 turns off the power source of the recorder block 52, and the process is ended.

In addition, at Step S610, when it is determined that there is data to be received, the process goes to Step S615 to perform the process steps described above.

Furthermore, at Step S613, when it is determined that there is no data to be received, Steps S614 to S616 are skipped, and the process goes to Step S611 to perform the process steps described above.

As described above, in the video camera 21, when the access point 23 is detected, the power source of the recorder block 52 is turned on while data is being transmitted or received.

In addition, in the video camera 21, when the access point 23 is not detected, that is, when it is difficult to do communications via the Internet 31, the power source of the recorder block 52 is turned off, in the block in which data of the clip to be the target for transmission and reception is reproduced or recorded, whereby power consumption by the video camera 21 can be reduced.

In addition, when the access point can be detected, the video camera 21 automatically starts connection to the network 31, whereby the user does not instruct starting connection to the network 31 to omit the user's efforts.

In addition, in the discussion above, the power source of the recorder block 52, that is, the power source supplied to all the components configuring the recorder block 52 is turned on, but the power source may be supplied only to the components used for recording or reproduction in the recorder block 52. In this case, when there is data to be transmitted, the power source supplied to the components used for reproduction is turned on, whereas when there is data to be received, the power source supplied to the components used for recording is turned on.

Next, a communication process in which the material using unit 29 communicates with the video camera 21 will be described with reference to FIG. 15.

Figure 14:
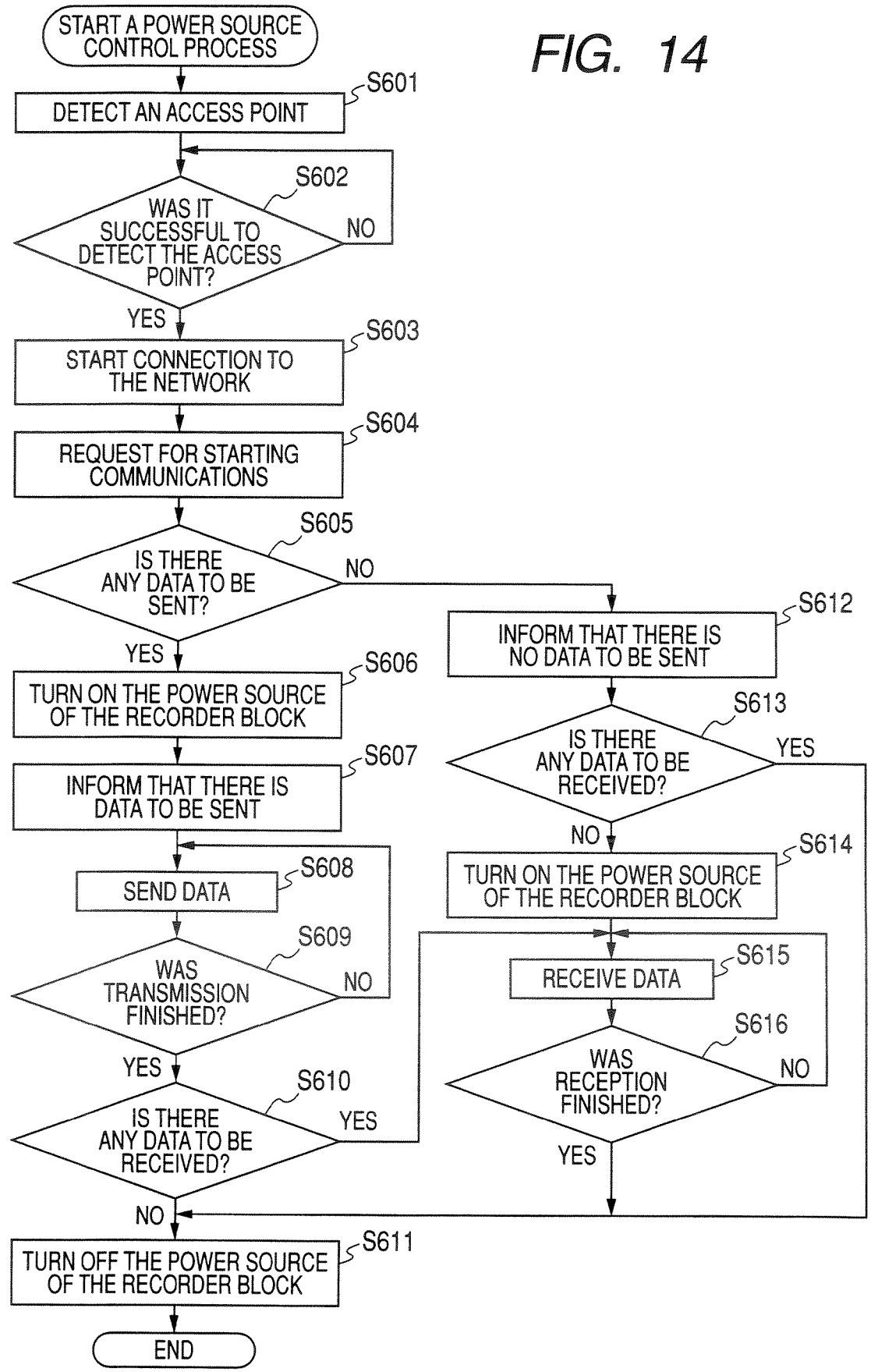
FIG. 14 shows a flow chart illustrative of a power source control process.

At Step S651, the receiving part 271 determines whether the transmission determining part 602 is requested to start communications at Step S604 shown in FIG. 14. When it determines that no request is made for starting communications, it waits until a request is made for starting communications.

On the other hand, at Step S651, when it determines that a request is made for starting communications, the process goes to Step S652. The receiving part 271 starts communications with the video camera 21, and the process goes to Step S653.

At Step S653, the receiving part 271 determines whether there is data to be received, that is, whether the transmission determining part 602 informs that there is data to be transmitted at Step S607 shown in FIG. 14. At Step S653, when it is determined that there is data to be received, the process goes to Step S654. The receiving part 271 receives data transmitted from the transmission determining part 602.

After the process at Step S654, the process goes to Step S655. The receiving part 271 determines whether the reception of data transmitted from the transmission determining part 602 is all finished. When it determines that the reception is not finished, the process returns to Step S654 to repeat the process steps described above.

On the other hand, at Step S655, when it is determined that the reception is finished, the process goes to Step S656. The receiving part 271 determines whether there is data to be transmitted to the video camera 21. When it determines that there is no data to be transmitted, the process goes to Step S657.

At Step S657, the receiving part 271 informs the video camera 21 that there is no data to be transmitted, and the process is ended.

In addition, at Step S653, when it is determined that there is no data to be received, at Step S658, the receiving part 271 determines whether there is data to be transmitted to the video camera 21 as similar to Step S656. When it determines that there is data to be transmitted, the process goes to Step S659.

At Step S659, the receiving part 271 notifies the video camera 21 that there is data to be transmitted. As described above, when the video camera 21 is notified that there is data to be transmitted, at Step S610 or S613 shown in FIG. 14, it is determined that there is data to be received. After the process at Step S659, the process goes to Step S660. The receiving part 271 transmits data to be transmitted to the video camera 21, and the process goes to Step S661. At Step S661, the receiving part 271 determines whether the transmission of data to be transmitted is all finished. When it determines that the transmission is not finished, the process returns to Step S660 to repeat the process steps described above.

On the other hand, at Step S661, when it is determined that the transmission is finished, the process is ended. In addition, at Step S658, when it is determined that there is no data to be transmitted, the process goes to Step S662. The receiving part 271 notifies that there is no data to be transmitted as similar to Step S657. As described above, at Step S657 or Step S662, when it is notified that there is no data to be transmitted, at Step S610 or S613 shown in FIG. 14, it is determined that there is no data to be received.

In addition, at Step S656, when it is determined that there is data to be transmitted, the process goes to Step S659 to perform the process steps described above.

Figure 15:
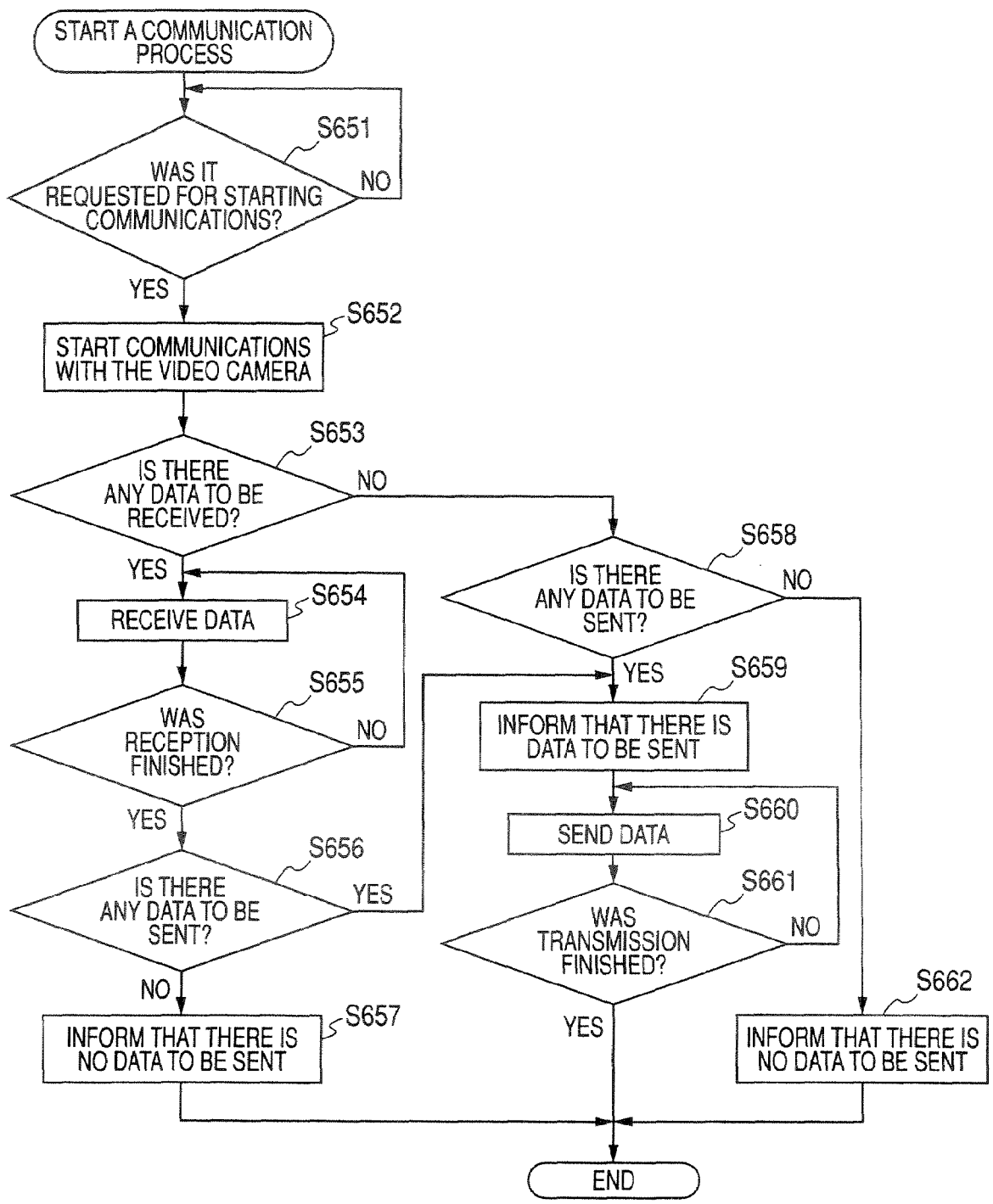
FIG. 15 shows a flow chart illustrative of a communication process.

In addition, in the discussion in FIGS. 13 to 15 above, when the detecting part 601 detects the access point 23, the transmission determining part 602 automatically starts connection to the network 31. However, connection to the network 31 may be started manually. In other words, this scheme may be done in which when the access point 23 is detected, the video camera 21 notifies the user that the access point is detected through the LCD 112 shown in FIG. 3, for example, and connection to the network 31 is started at the time when the user received that notification starts connection to the network 31.

In addition, the user may select the automatic or manual start of connection to the network 31.

In addition, the transmitting apparatus according to an embodiment of the invention can be also adapted to the device with no shooting function such as a personal computer. For example, a user records data of clips acquired by the video camera 21 on a removable medium 33, and the removable medium 33 is mounted on the personal computer, whereby data of clips acquired by the video camera 21 can be transmitted to the material using unit 29.

In addition, in the discussion above, the clips are categorized into groups for each recording ID, but clips may be categorized into groups for each device ID.

Furthermore, in the item "the destination" (FIG. 6) that is the contents of grouping metadata, the item "FTP site URL" may be disposed in which an FTP site URL is described, not the item "website URL". In addition, in the discussion above, the video camera 21 transmits data of clips to the material using unit 29 corresponding to the URL based on the URL that is the contents of the item "website URL", but it may be transmit data of clips to the material using unit 29 corresponding to the E-mail address based on the E-mail address that is the contents of the item "E-mail address".

As described above, in the video camera 21, the destination detecting part 251 reads the contents of the item "website URL" of grouping metadata, and the transmitting part 253 transmits data of clips categorized into the group for each recording ID and the recording ID. In the material using unit 29, the receiving part 271 receives data of clips and the recording ID, and the record control part 273 records data of clips in folders corresponding to the recording ID based on the recording ID. Therefore, when data is transmitted to another device and recorded therein, the data can be easily stored in a desired folder of a desired device.

In addition, in the specification, steps describing the program stored in the program recording medium of course include process steps done in time series along the described order as well as process steps done in parallel or separately not necessarily done in time series.

In addition, in the specification, the system describes the overall apparatus configured of a plurality of devices.

In addition, embodiments of the invention are not limited to the above embodiments, which can be modified in the scope not deviating from the teaching of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitter-receiver system comprising:
   a transmitting apparatus configured to transmit data categorized into groups recorded on a recording medium; and
   a receiving apparatus configured to receive the data;
   wherein the transmitting apparatus includes:
   a read unit configured to read an identification tag for a recording event for the media data and a group information classifying the media data of the recording event into a group configured to acquire the media data of the recording event from an acquisition device, configured to associate the identification tag and the group information to the acquired media data, and configured to record the identification tag and the group information together with the acquired media data on the recording medium;
   a destination detection part that extracts a location information from the group information, the location information indicating a destination address of the receiving apparatus for receiving the acquired media data; and
   a transmitting unit configured to transmit the acquired media data, the identification tag, and the group information to the receiving apparatus identified by the location information, and
   the receiving apparatus includes:
   a receiving unit configured to receive the acquired media data, the identification tag, and the group information transmitted from the transmitting unit;
   a record control unit configured to record the group information and the acquired media data into at least one folder;
   a reception determining part configured to detect whether media data will be received; and
   a power source control part, configured to turn on a power supply for the record control unit, when the reception determining part has indicated that media data will be received.

2. The transmitter-receiver system according to claim 1, wherein
   the record control unit is further configured to record the group information into a first folder, and the acquired media data in a second folder, the second folder corresponding to the identification tag.

3. A transmitting apparatus configured to transmit media data recorded on a recording medium, the transmitting apparatus comprising:
   a read unit configured to read an identification tag for a recording event for the media data and a group information classifying the media data of the recording event into a group, configured to acquire the media data of the recording event from an acquisition device, configured to associate the identification tag and the group information to the acquired media data, and configured to record the identification tag and the group information together with the acquired media on the recording medium;
   a destination detection part that extracts a location information from the group information, the location information indicating a destination address of a receiving apparatus for receiving the acquired media data;
   a transmitting unit configured to transmit the acquired media data, the identification tag, and the group information to the receiving apparatus identified by the location information; and
   a transmission determining part configured to send a notification to the receiving apparatus, the notification configured to cause a power source control part of the receiving apparatus to turn on a power supply for a record control unit, in order to record the acquired media data, the identification tag, and the group information.

4. The transmitting apparatus according to claim 3, wherein media data that has been captured by a same acquisition device is classified within the group.

5. A transmitting method of a transmitting apparatus configured to transmit media data recorded on a recording medium, the transmitting method comprising the steps of:
   reading an identification tag for a recording event for the media data and a group information classifying the media data of the recording event into a group;
   acquiring the media data of the recording event from an acquisition device;
   associating the identification tag and the group information to the acquired media data recording the identification tag and the group information together with the acquired media data;
   extracting a location information from the group information, the location information indicating a destination address of a receiving apparatus for receiving the acquired media data;
   transmitting the acquired media data, the identification tag, and the group information to the receiving apparatus identified by the location information; and
   sending a notification to the receiving apparatus, the notification configured to cause a power source control part of the receiving apparatus to turn on a power supply for a record control unit, in order to record the acquired media data, the identification tag, and the group information.

6. A computer readable medium having a program stored thereon, the program configured to allow a computer to execute a method to transmit media data recorded on a recording medium, the method comprising the steps of:
   reading an identification tag for a recording event for the media data and a group information classifying the media data of the recording event into a group;
   acquiring the media data of the recording event from an acquisition device;
   associating the identification tag and the group information to the acquired media data recording the identification tag and the group information together with the acquired media data;
   extracting a location information from the group information, the location information indicating a destination address of a receiving apparatus for receiving the acquired media data;
   transmitting the acquired media data, the identification tag, and the group information to the receiving apparatus identified by the location information; and
   sending a notification to the receiving apparatus, the notification configured to cause a power source control part of the receiving apparatus to turn on a power supply for a record control unit, in order to record the acquired media data, the identification tag, and the group information.

7. A receiving apparatus configured to receive media data, the receiving apparatus comprising:
   a receiving unit configured to receive the media data of a recording event, the identification tag for the recording event, and a group information classifying the media data of the recording event into a group;
   a record control unit configured to record the group information and the acquired media data in at least one folder;
   a record destination determining part that identifies the at least one folder for the group information based on data of the group information, and identifies the at least one folder for the acquired media based on data of the identification tag;
   a reception determining part configured to detect whether media data will be received; and
   a power source control part, configured to turn on a power supply for the record control unit and the storage, when the reception determining part has indicated that media data will be received.

8. The receiving apparatus according to claim 7, wherein
   the record control unit is further configured to record the group information in a first folder, and the acquired media data in a second folder, the second folder corresponding to the identification tag; and
   the record destination determining part is further configured to identify the first folder for the group information based on data of the group information, and to identify the second folder for the acquired media based on data of the identification tag.

9. A receiving method of a receiving apparatus configured to receive media, the receiving method comprising the steps of:
   receiving the media data of a recording event, the identification tag for the recording event, and a group information indicating a group classifying the media data of the recording event into a group;
   determining at least one folder in a storage for the group information based on data of the group information;
   and for the acquired media based on data of the identification tag;
   recording the group information and the acquired media data in the at least one folder;
   detecting whether media data will be received; and
   turning on a power supply for the storage, when said step of detecting has indicated that the media data will be received.

10. The receiving method according to claim 9, wherein said step of determining further comprises:
    determining a first folder in a storage for the group information based on data of the group information; and
    determining a second folder in the storage for the acquired media based on data of the identification tag, and wherein said step of recording further comprises,
    recording the group information in the first folder, and the acquired media data in the second folder, the second folder corresponding to the identification tag.

11. A computer readable medium having a program stored thereon, the program configured to allow a computer to execute a method to receive media data, the method comprising the steps of:
    receiving the media data of a recording event, the identification tag for the recording event, and a group information classifying the media data of the recording event into a group;
    determining at least one folder in a storage for the group information based on data of the group information
    and for the acquired media based on data of the identification tag;
    recording the group information and the acquired media data in the at least one folder;
    detecting whether media data will be received; and
    turning on a power supply for the storage, when said step of detecting has indicated that the media data will be received.

12. The computer readable medium according to claim 11, wherein said step of determining further comprises:
    determining a first folder in a storage for the group information based on data of the group information; and
    determining a second folder in the storage for the acquired media based on data of the identification tag, and wherein said step of recording further comprises,
    recording the group information in the first folder, and the acquired media data in the second folder, the second folder corresponding to the identification tag.

* * * * *